(12) United States Patent
Katou et al.

(10) Patent No.: US 7,693,636 B2
(45) Date of Patent: Apr. 6, 2010

(54) VEHICLE DRIVE CONTROL SYSTEM AND METHOD

(75) Inventors: Yoshiaki Katou, Kanagawa (JP); Kenji Nakashima, Shizuoka (JP)

(73) Assignee: JATCO Ltd, Fuji (JP)

( * ) Notice: Subject to any disclaimer, the term of this patent is extended or adjusted under 35 U.S.C. 154(b) by 1093 days.

(21) Appl. No.: 11/350,083

(22) Filed: Feb. 9, 2006

(65) Prior Publication Data

US 2006/0184304 A1 Aug. 17, 2006

(30) Foreign Application Priority Data

Feb. 14, 2005 (JP) .............................. 2005-036410

(51) Int. Cl.
*G06F 17/00* (2006.01)
(52) U.S. Cl. .............................. 701/54; 701/51; 477/79; 477/159; 477/175; 477/179; 477/180
(58) Field of Classification Search .................. 701/51, 701/54, 61
See application file for complete search history.

(56) References Cited

U.S. PATENT DOCUMENTS

| | | | | |
|---|---|---|---|---|
| 4,263,822 A | * | 4/1981 | Harmon | 477/64 |
| 5,611,754 A | * | 3/1997 | Haga et al. | 477/181 |
| 5,679,099 A | * | 10/1997 | Kato et al. | 477/176 |
| 6,258,008 B1 | * | 7/2001 | Tabata et al. | 477/107 |
| 6,321,150 B1 | * | 11/2001 | Nitta | 701/29 |
| 2001/0051847 A1 | * | 12/2001 | Murakami | 701/54 |
| 2004/0020461 A1 | * | 2/2004 | Miyashita et al. | 123/399 |
| 2004/0043867 A1 | * | 3/2004 | Sato et al. | 477/144 |
| 2004/0138800 A1 | * | 7/2004 | Brandt et al. | 701/51 |
| 2006/0178796 A1 | * | 8/2006 | Kuwahara et al. | 701/51 |

FOREIGN PATENT DOCUMENTS

JP 2000-266172 A 9/2000

* cited by examiner

*Primary Examiner*—Khoi Tran
*Assistant Examiner*—Rodney King
(74) *Attorney, Agent, or Firm*—Foley & Lardner LLP

(57) ABSTRACT

A drive control system for an automotive vehicle includes an engine, an automatic transmission, a torque converter, a start clutch, an oil pump, a hydraulic pressure control unit, an engine control unit, an automatic engine stop/restart control unit and a torque transmission control unit configured to calculate target start clutch engagement time and torque based on an accelerator opening of the vehicle, calculate a target engine torque based on the target clutch engagement torque and cause the hydraulic control unit and the engine control unit to control the engagement state of the start clutch and the output torque of the engine according to the target clutch engagement time and torque and the target engine torque at a restart of the engine.

13 Claims, 17 Drawing Sheets

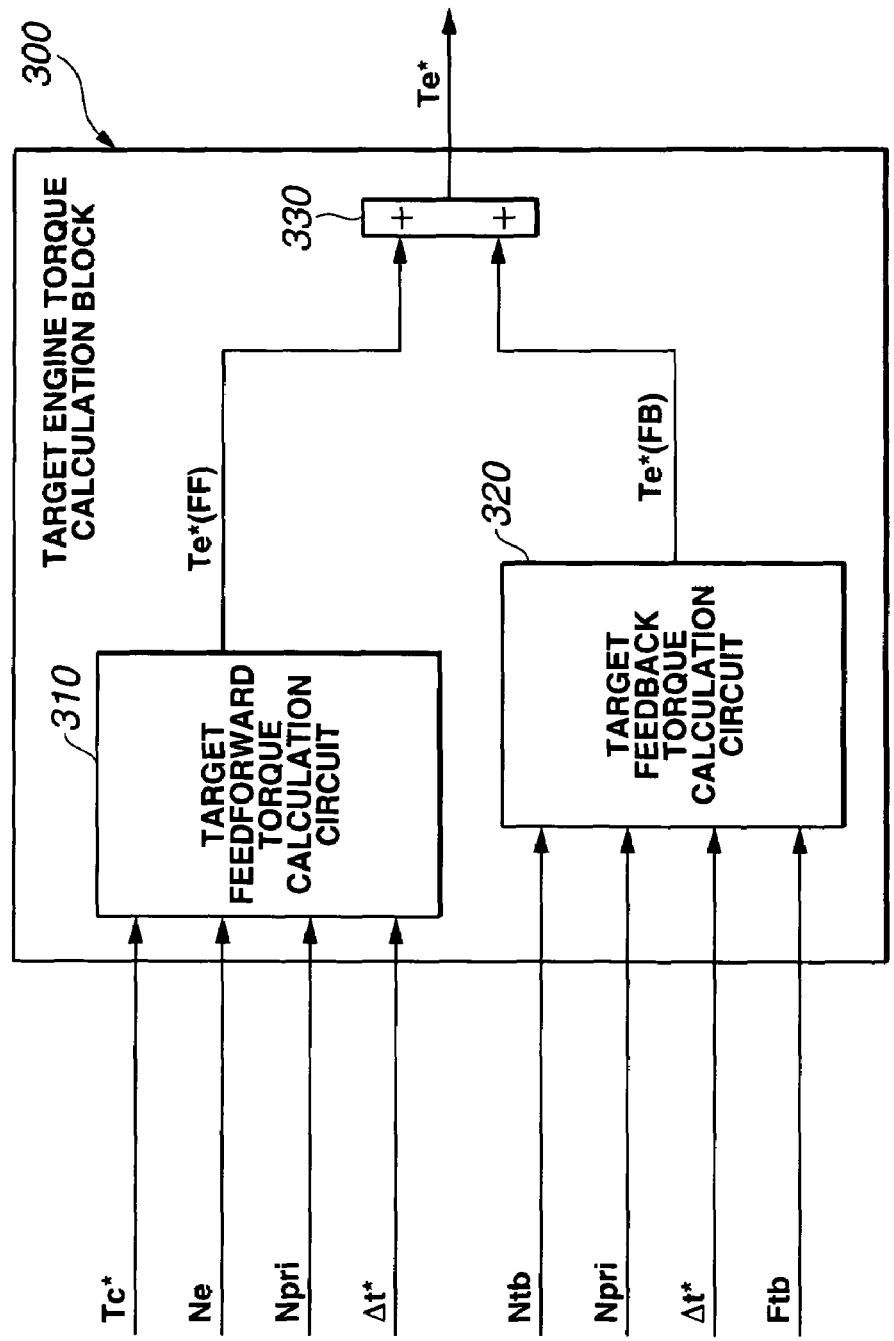

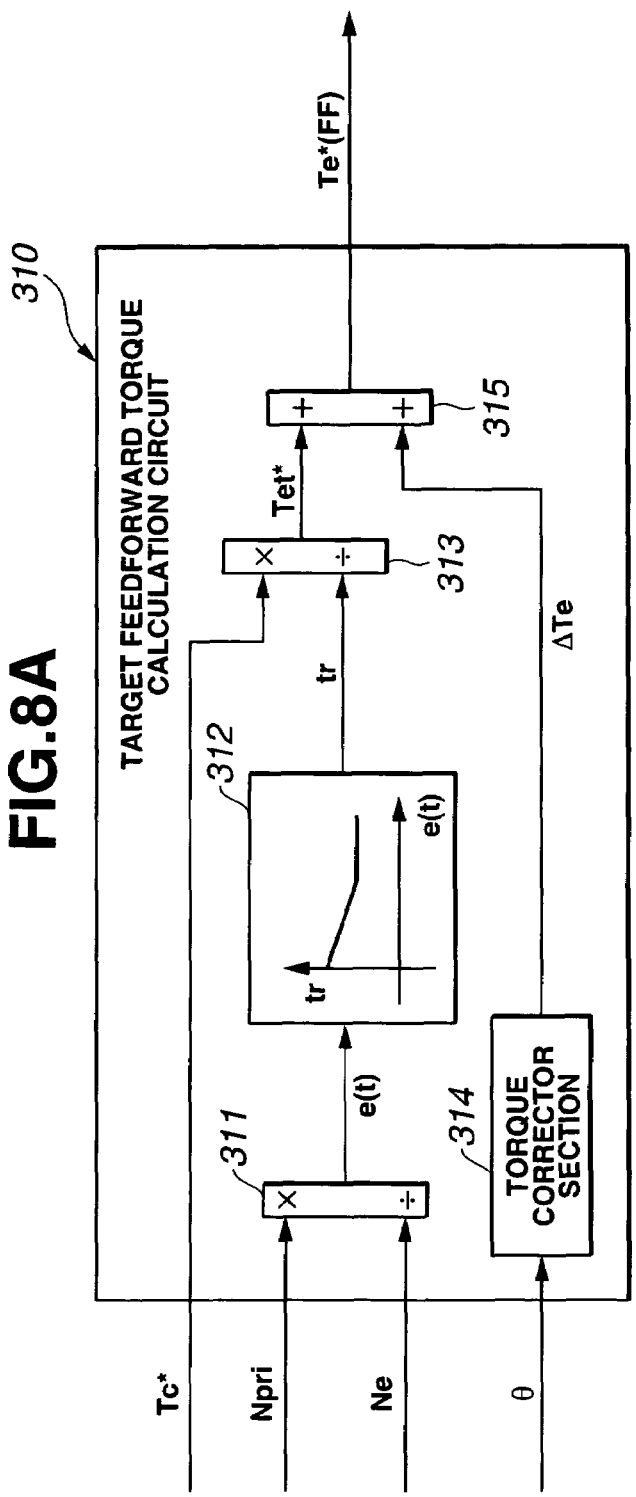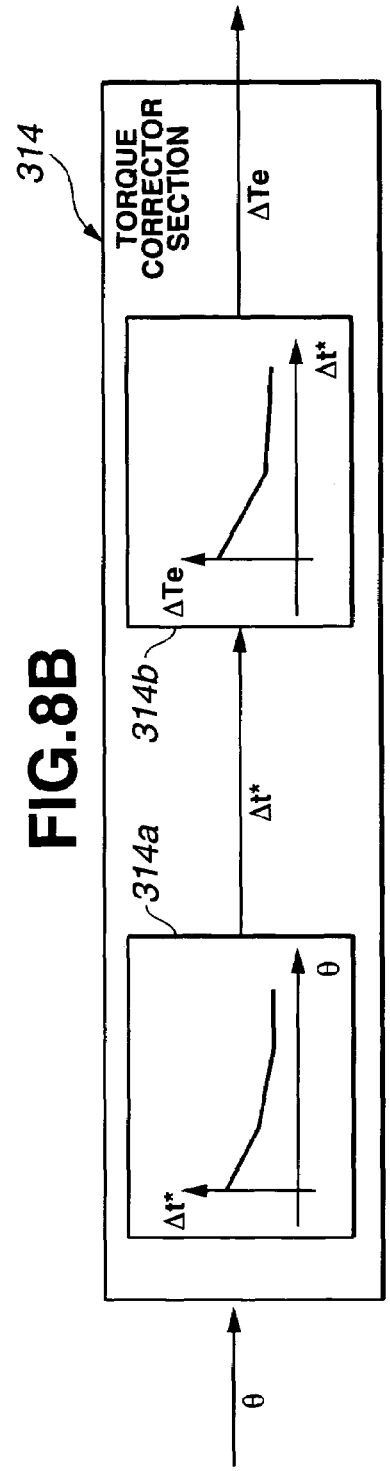

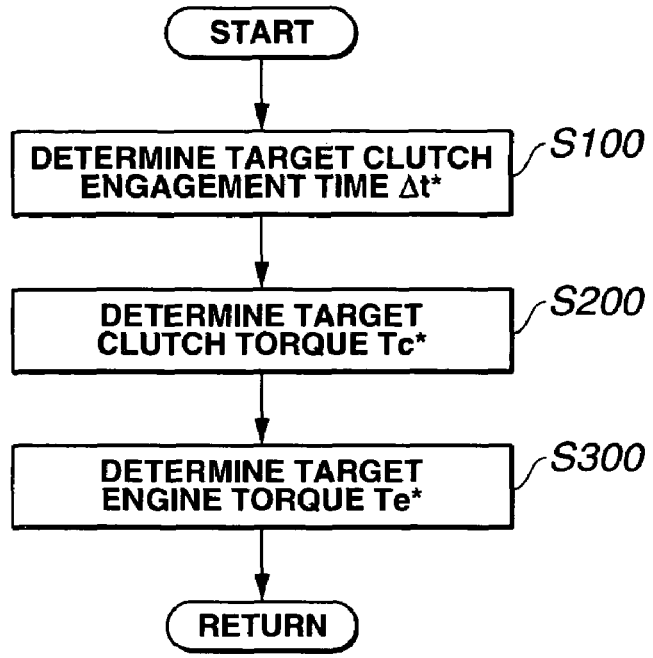
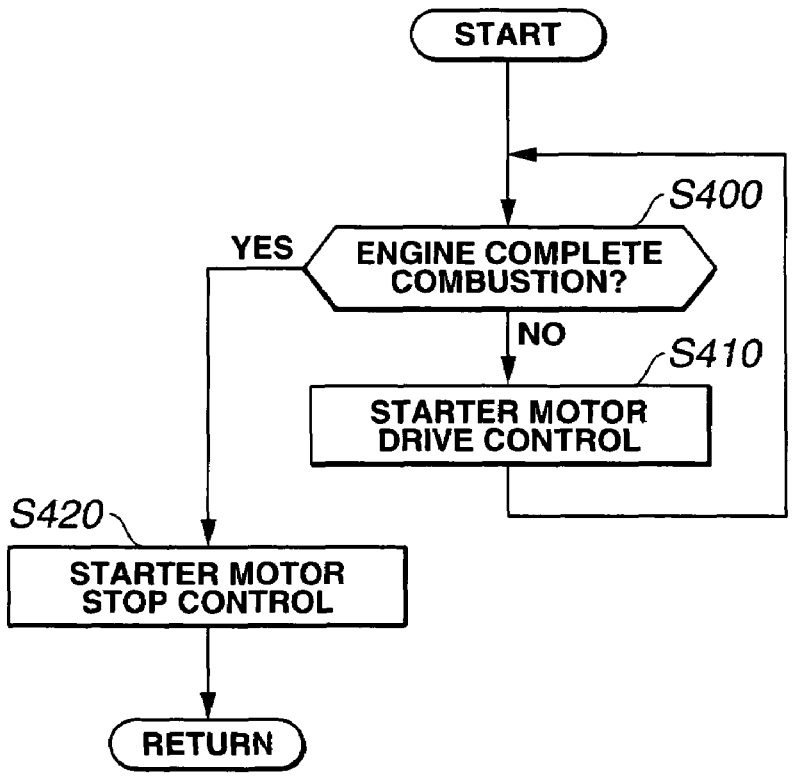

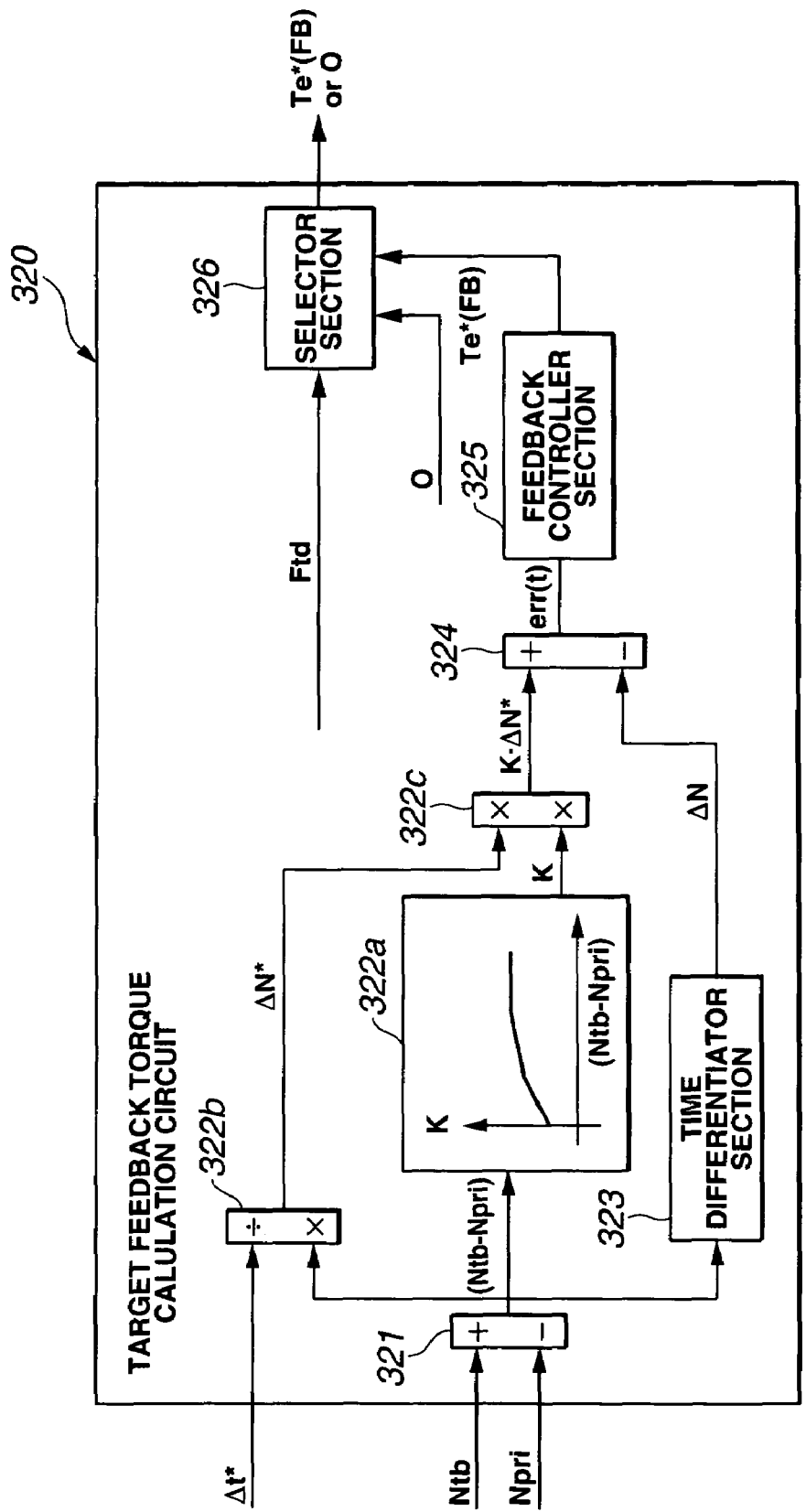

VEHICLE DRIVE CONTROL SYSTEM AND METHOD

CROSS-REFERENCE TO RELATED PATENT APPLICATIONS

Japan Priority Application 2005-036410, filed Feb. 14, 2005 including the specification, drawings, claims and abstract, is incorporated herein by reference in its entirety.

BACKGROUND OF THE INVENTION

The present invention relates to a drive control system for an automotive vehicle having an automatic engine stop/restart function (also called an idle stop control function), particularly of the kind suitable for use with a belt-type continuously variable automatic transmission. The present invention also relates to a drive control method for an automotive vehicle.

Japanese Laid-Open Patent Publication No. 2000-266172 discloses a vehicle drive control system that has an automatic engine stop/restart function and performs clutch engagement control to shift a start clutch of an automatic transmission device from a precharge phase into an engagement phase when the engine speed reaches a predetermined level at an engine restart after an idle stop.

SUMMARY OF THE INVENTION

The amount of hydraulic oil supplied to the start clutch depends on various transmission hydraulic control parameters such as oil pump characteristics (e.g. the dependency of pump volumetric efficiency on pump operation speed) and valve leaks. Further, the oil pump and valve operation performance varies with time to exert a great effect on the amount of hydraulic oil supplied to the start clutch. It is thus difficult to judge whether the start clutch has secured a sufficient hydraulic pressure by predicting the completion of the clutch precharge phase based on the engine speed.

The engine speed is generally held at an idle speed until the start clutch comes into engagement. If the start clutch shifts into the engagement phase without securing a sufficient hydraulic pressure, it takes a long time to complete the engagement of the start clutch. In such a case, the engine speed cannot be easily increased even under full-throttle acceleration so that there arises a large vehicle starting time lag.

It is therefore an object of the present invention to provide a vehicle drive control system capable of enabling a vehicle to make a smooth start, even under insufficient transmission hydraulic pressure conditions, upon an engine restart after an idle stop.

It is also an object of the present invention to provide a drive control method for an automotive vehicle.

According to a first aspect of the present invention, there is provided a drive control system for an automotive vehicle, comprising: an engine; an automatic transmission; a torque converter disposed between the engine and the automatic transmission; an oil pump driven in synchronism with the engine; a start clutch engaged under a hydraulic oil pressure discharged from the oil pump to allow torque transmission from the engine to the automatic transmission via the torque converter at a start of the vehicle; an engine control unit that controls an output torque of the engine; a hydraulic pressure control unit that regulates the hydraulic pressure to control an engagement state of the start clutch; an automatic engine stop/restart control unit that stops the engine upon satisfaction of certain vehicle conditions and to restart the engine upon dissatisfaction of the certain vehicle conditions; and a torque transmission control unit configured to: calculate target engagement time and torque of the start clutch based on an accelerator opening of the vehicle; calculate a target engine torque based on the target clutch engagement torque; and cause the hydraulic control unit and the engine control unit to control the engagement state of the start clutch and the output torque of the engine according to the target clutch engagement time and torque and the target engine torque, at a restart of the engine.

According to a second aspect of the present invention, there is provided a drive control system for an automotive vehicle, the vehicle having an engine, an automatic transmission, a torque converter and a start clutch engaged to transmit an output torque of the engine to the automatic transmission via the torque converter at a start of the vehicle, the drive control system comprising: means for automatically stopping the engine upon satisfaction of certain vehicle conditions and restarting the engine upon dissatisfaction of the certain vehicle conditions; means for controlling an output torque of the engine; means for supplying a hydraulic pressure to engage the start clutch at a restart of the engine; means for detecting an accelerator opening of the vehicle; means for determining a target clutch engagement time based on the accelerator opening; means for determining target clutch engagement pressure and torque based on the accelerator opening and the target clutch engagement time; means for determining a target engine torque based on the target clutch engagement torque; means for adjusting the hydraulic pressure to the target clutch engagement pressure; and means for adjusting the output torque of the engine to the target engine torque.

According to a third aspect of the present invention, there is provided a drive control method for an automotive vehicle, the vehicle having an engine, an automatic transmission, a torque converter and a start clutch engaged to transmit an output torque of the engine to the automatic transmission via the torque converter at a start of the vehicle, the drive control method comprising: stopping the engine upon satisfaction of certain vehicle conditions; after said stopping, restarting the engine upon dissatisfaction of the certain vehicle conditions; upon said restarting, supplying a hydraulic pressure to engage the start clutch; detecting an accelerator opening of the vehicle; determining a target clutch engagement time based on the accelerator opening; determining target clutch engagement pressure and torque based on the accelerator opening and the target clutch engagement time; determining a target engine torque based on the target clutch engagement torque; adjusting the hydraulic pressure to the target clutch engagement pressure; and adjusting the output torque of the engine to the target engine torque.

The other objects and features of the present invention will also become understood from the following description.

BRIEF DESCRIPTION OF THE DRAWINGS

FIG. 7 is a schematic diagram of a target engine torque calculation block of the torque transmission controller according to the first embodiment of the present invention.

FIG. 8A is a configuration diagram of a target feedforward torque calculation circuit of the target engine torque calculation block according to the first embodiment of the present invention.

FIG. 8B is a configuration diagram of a torque corrector section of the target feedforward torque calculation circuit of the target engine torque calculation block according to the first embodiment of the present invention.

FIG. 10A is a flowchart for a torque control program of the torque transmission controller according to the first embodiment of the present invention.

FIG. 10B is a flowchart for a starter motor drive control program of an engine control unit of the vehicle drive control system according to the first embodiment of the present invention.

FIG. 17 is a configuration diagram of a target feedback torque calculation circuit of a target engine torque calculation block of an torque transmission controller of a vehicle drive control system according to a second embodiment of the present invention.

DESCRIPTION OF THE EMBODIMENTS

Figure 1:
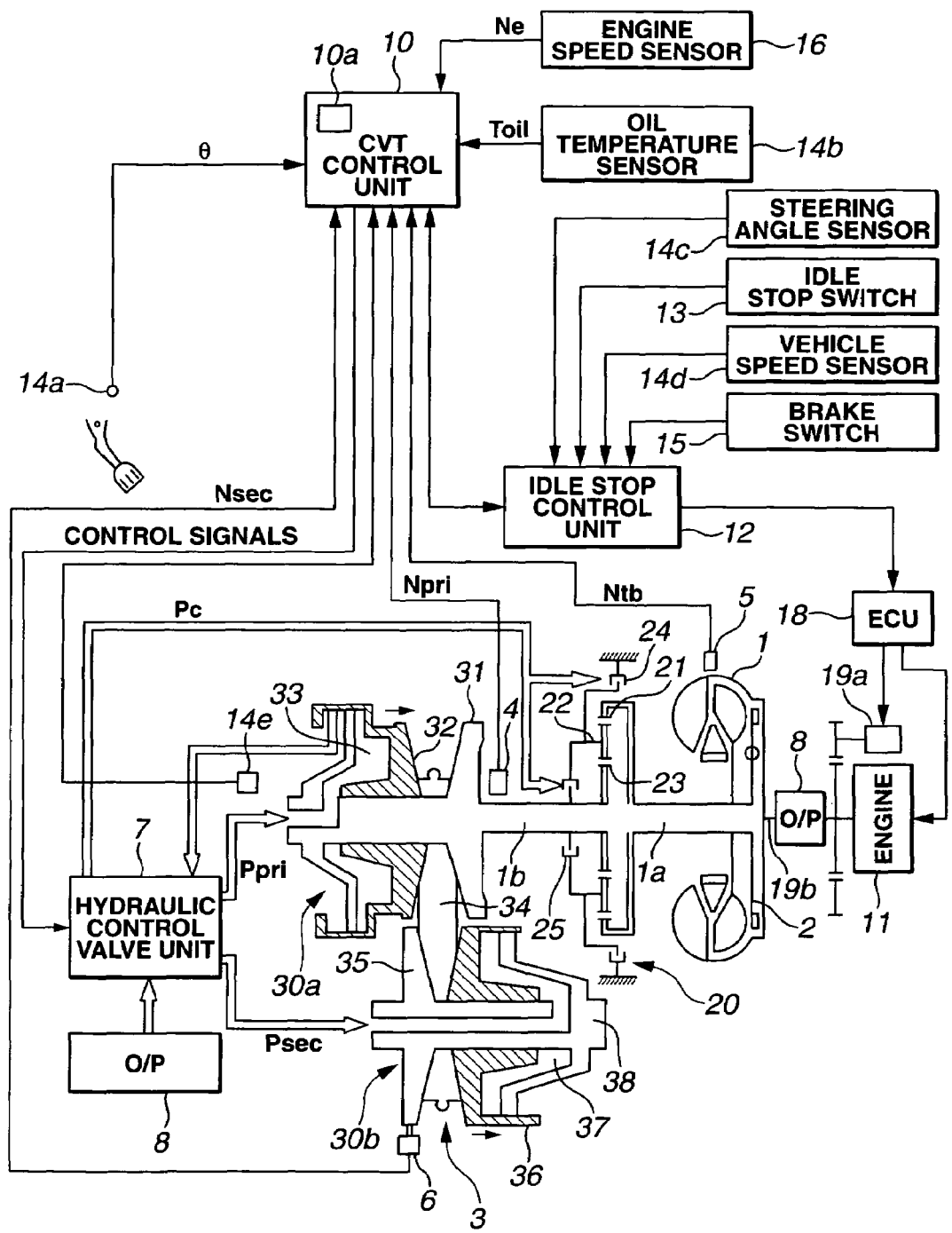
FIG. 1 is a schematic view of a vehicle drive control system according to a first embodiment of the present invention.

The present invention will be described below by way of the following first and second embodiments, in which like parts and portions are designated by like reference numerals to thereby omit repeated explanations thereof.

A drive control system for an automotive vehicle according to the first embodiment of the present invention will be now explained below with reference to FIGS. 1 to 16.

As shown in FIG. 1, the vehicle drive control system of the first embodiment includes an engine 11, an automatic transmission device with a torque converter 1, a forward/reverse changeover unit 20, a belt-type continuously variable transmission (CVT) 3, a hydraulic control valve unit 7 and an oil pump 8, a starter motor 19a, a CVT control unit 10 with a torque transmission controller 10a, an engine control unit (ECU) 18, an idle stop control unit 12 and an idle stop switch 13.

The torque converter 1 is connected to an output shaft 19b of the engine 11 and has a lock-up clutch 2 to establish a connection between the engine 11 and the CVT 3 via the forward/reverse changeover unit 20.

The oil pump 8 is also connected to the engine output shaft 19b so as to operate in synchronism with the engine 11 to supply a hydraulic oil to the hydraulic control valve unit 7.

The forward/reverse changeover unit 20 has a planetary gear train consisting of a ring gear 21 connected to a turbine shaft (output shaft) 1a of the torque converter 1, a sun gear 23 connected to an input shaft 1b of the CVT 3 and a pinion carrier 22 disposed between the ring gear 21 and the sun gear 23, a reverse brake 24 for fixing the pinion carrier 22 to a transmission case and a forward clutch 25 (as a start clutch) for connecting the pinion carrier 22 to the transmission input shaft 1b. The forward clutch 25 is engaged at a start of the vehicle to change its engagement state in response to the supply of a clutch engagement pressure Pc from the oil pump 8 through the hydraulic control valve unit 7 and thereby allow torque transmission from the engine 11 to the CVT 3 via the torque converter 1.

The CVT 3 has a primary pulley 30a mounted on an end of the transmission input shaft 1b, a secondary pulley 30b mounted on a driven shaft 38 of the CVT 3 and a power transmission belt 34 drivingly connecting the primary pulley 30a to the secondary pulley 30b as shown in FIG. 1.

The primary pulley 30a includes a fixed conical pulley disc 31 rotated together with the transmission input shaft 1b, a movable conical pulley disc 32 opposed to the pulley disc 31 to define a V-shaped pulley groove between the pulley discs 31 and 32, and a cylinder chamber 33. The pulley disc 32 is moved in the axial direction of the transmission input shaft 1b according to an oil pressure supplied to the cylinder chamber 33 (referred to as a "primary pulley clamping pressure Ppri"), thereby adjusting the width of the primary pulley groove and changing the contact radius between the belt 34 and the primary pulley 30a.

The secondary pulley 30b has a fixed conical pulley disc 35 rotated together with the transmission driven shaft 38, a movable conical pulley disc 36 opposed to the pulley disc 35 to define a V-shaped pulley groove between the pulley discs 35 and 36, and a cylinder chamber 37. The pulley disc 36 is moved in the axial direction of the transmission driven shaft 38 according to an oil pressure supplied to the cylinder chamber 37 (referred to as a "secondary pulley clamping pressure Psec"), thereby adjusting the width of the secondary pulley groove and changing the contact radius between the belt 34 and the secondary pulley 30b.

Although not shown in the drawings, the transmission driven shaft 38 is connected to driving wheels through a driving gear, an idler gear, a final reduction gear and a differential gear.

With such a power train arrangement, a driving torque of the engine 11 is inputted into the CVT 3 through the torque converter 1 and the forward/reverse changeover unit 20, transmitted from the primary pulley 30a to the secondary pulley 30b via the belt 34, and then, outputted to the driving wheels through the driving gear, the idler gear, the final reduction gear and the differential gear. The rotation speed ratio between the primary pulley 30a and the secondary pulley 30b, i.e., the power transmission ratio of the CVT 3 is varied continuously by moving the pulley discs 32 and 36 of the primary and secondary pulley 30a and 30b and changing the radius of the belt 34 coming into contact with the pulleys 30a and 30b. In other words, the power transmission ratio of the CVT 3 varies by adjusting the primary and secondary pulley clamping pressures Ppri and Psec.

Figure 2:
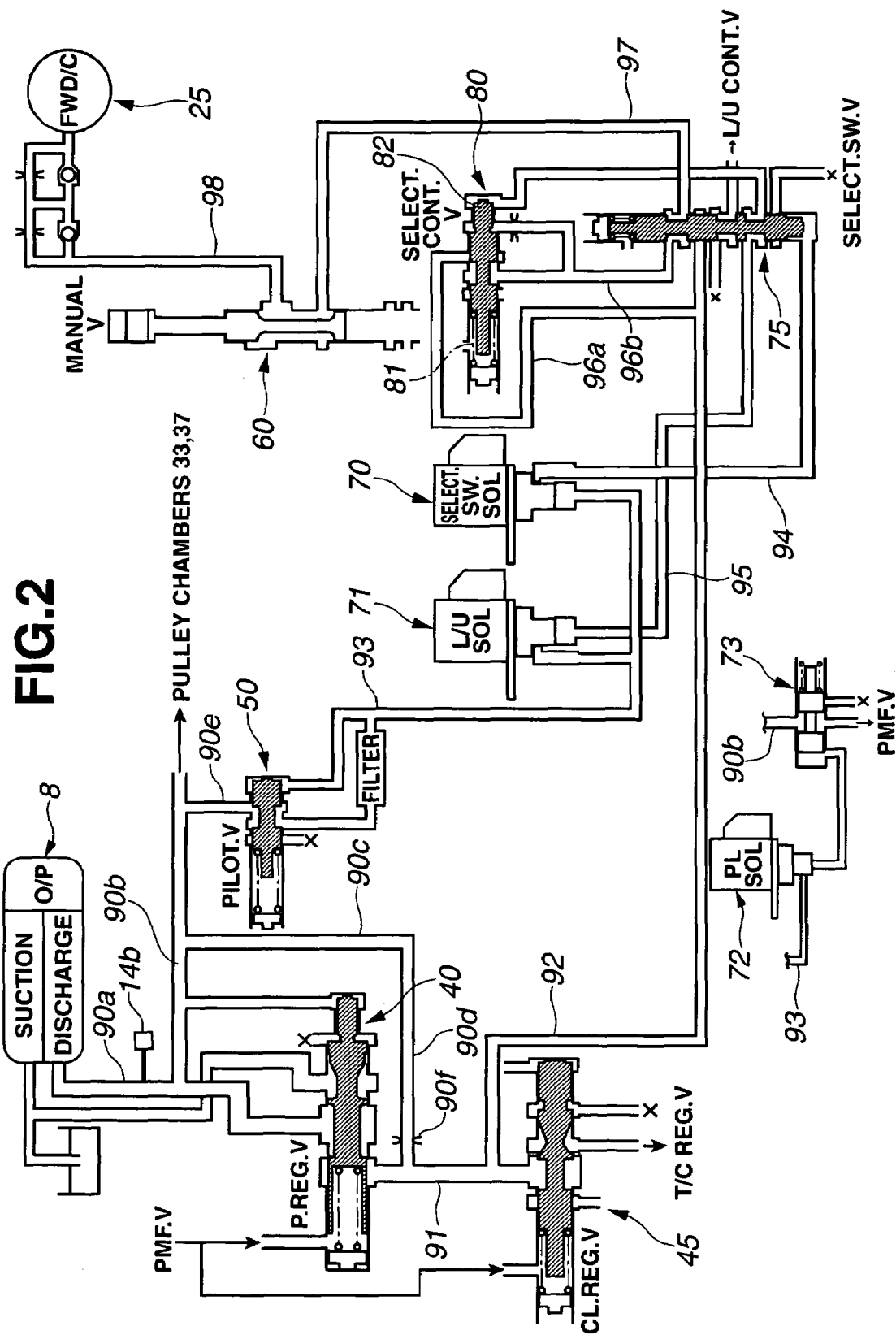
FIG. 2 is a schematic diagram of a transmission hydraulic control valve unit of the vehicle drive control system according to the first embodiment of the present invention.

As shown in FIGS. 1 and 2, the vehicle drive control system further includes a primary pulley rotation speed sensor 4 to detect a rotation speed Npri of the primary pulley 30a which corresponds to an output shaft rotation speed of the forward clutch 25, a turbine rotation speed sensor 5 to detect a rotation speed Ntb of the turbine shaft 1a, a secondary pulley rotation speed sensor 6 to detect a rotation speed Nsec of the secondary pulley 30b, an accelerator opening sensor 14a to detect the stroke θ of an accelerator pedal of the vehicle (hereinafter referred to as an "accelerator opening"), an oil temperature sensor 14b to detect a transmission oil temperature Toil of the vehicle, a steering angle sensor 14c to detect an steering wheel angle (hereinafter just referred to as a "steering angle") of the vehicle, a vehicle speed sensor 14d to detect a traveling speed of the vehicle, a line pressure sensor 14e to detect a line pressure of the hydraulic control valve unit 6 (i.e. a source pressure of the pulley clamping pressures Ppri and Psec), a brake switch 15 to detect the ON-OFF state of a brake pedal of the vehicle and an engine speed sensor to detect an operating speed Ne of the engine 11. The detection signals from the accelerator opening sensor 14a, the oil temperature sensor 14b, the pulley rotation speed sensors 4, 6, the turbine speed sensor 5 and the engine speed sensor 16 are inputted into the CVT control unit 10, whereas the detection signals from the steering angle sensor 14c, the idle stop switch 13, the vehicle speed sensor 14d and the brake switch 15 are inputted into the idle stop control unit 12. These sensor signals are mutually communicated between the CVT control unit 10 and the idle stop control unit 12.

The CVT control unit 10 controls the operations of the hydraulic control valve unit 7 based on the sensor detection signals so as to adjust the forward clutch engagement pressure Pc and the pulley clamping pressure Ppri and Psec and thereby change the engagement state of the start clutch 25 and the power transmission ratio of the CVT 3 according to vehicle driving conditions.

In the first embodiment, the hydraulic control valve unit 7 includes a pressure regulator valve 40, a clutch regulator valve 45, a pilot valve 50, a lock-up solenoid 71, a selector switching solenoid 70, a selector switching valve 75, a selector control valve 80 with a return spring 81 and a valve spool 82, a line pressure solenoid 72, a manual valve 60, a pressure modifier valve 73, oil passages 90a to 90e, 91 to 95, 96a, 96b, 97 and 98 and an orifice 90f as shown in FIG. 2.

The pressure regulator valve 40 receives a hydraulic oil pressure discharged from the oil pump 8 via the oil passage 90a and regulates the pump discharge pressure into the line pressure (the source pressure of the pulley clamping pressures Ppri and Psec). The line pressure is supplied to the pulley cylinder chambers 33 and 37 and the pilot valve 50 via the oil passages 90a, 90b and 90e. The line pressure is also supplied to the pressure modifier valve 73 via the oil passage 90b.

The clutch regulator valve 45 receives a relief pressure from the pressure regulator valve 40 via the oil passage 91 and regulates the relief pressure into the forward clutch engagement pressure Pc. Herein, the oil passage 91 is communicated with the oil passage 90b through the oil passages 90c and 90d and the orifice 90f. The clutch engagement pressure Pc is supplied to the selector switching valve 75 and the selector control valve 80 via the oil passage 92.

The pilot valve 50 regulates the line pressure to supply a constant pilot pressure to the selector switching solenoid 70, the lock-up solenoid 71 and the line pressure solenoid 92 via the oil passage 93.

The selector switching solenoid 70 is selectively switched between the ON state and the OFF state to supply according to its ON/OFF state a signal pressure to the selector switching valve 75 via the oil passage 94 for control of the operations of the selector switching valve 75. The lock-up solenoid 71 supplies a signal pressure to the selector switching valve 75 via the oil passage 95. The signal pressure from the lock-up solenoid 71 is fed to the selector control valve 80 through the selector switching valve 75 when the selector switching solenoid 70 is ON, and then, fed to a lock-up control valve (not shown) through the selector switching valve 75 when the selector switching solenoid 70 is OFF.

The selector control valve 80 opens by moving the valve spool 82 against the tension of the return spring 81 upon receipt of the signal pressure from the lock-up solenoid 71 and closes by biasing the valve spool 82 (to the right side of FIG. 2) under the tension of the return spring 81 without no signal pressure from the lock-up solenoid 71.

The pressure modifier valve 73 regulates the line pressure into a signal pressure under the control of the line pressure solenoid 72 and supplies the signal pressure to the pressure regulator valve 40 and the clutch regulator valve 45 such that the pressure regulator valve 40 and the clutch regulator valve 45 operate upon receipt of the signal pressure from the pressure modifier valve 73. In the first embodiment, the signal pressure of the pressure modifier valve 73 is set higher than those of the solenoids 70, 71 and 72 so as to obtain an improvement in pressure regulation performance even in a high hydraulic pressure range.

When the forward clutch 25 shifts from a disengaged state into an engaged state, the selector switching solenoid 70 and the lock-up solenoid 71 are switched on to interrupt direct communication between the oil passages 92 and 97. The clutch engagement pressure Pc from the clutch regulator valve 45 is fed to the selector control valve 80 via the oil passage 96a. The signal pressure from the lock-up solenoid 71 is concurrently supplied to the selector control valve 80. The selector control valve 80 adjusts the clutch engagement pressure Pc under the signal pressure from the lock-up solenoid 71 and outputs the adjusted clutch engagement pressure Pc to the selector switching valve 75 via the oil passage 96b. The clutch engagement pressure Pc is then supplied to the forward clutch 25 through the manual valve 60 and the oil passages 97 and 98. It should be noted that there is a limit on the maximum attainable level of the clutch engagement pressure Pc when the fine adjustment of the clutch engagement pressure Pc is made by the selector control valve 80 under the signal from the lock-up solenoid 71.

On the other hand, the selector switching solenoid 70 and the lock-up solenoid 71 are switched off to allow direct communication between the oil passages 42 when the forward clutch 25 is engaged. The clutch engagement pressure Pc is directly passed from the oil passage 92 to the oil passage 97 through the selector switching valve 75 without being adjusted by the selector control valve 80, and then, supplied to the forward clutch 25 through the manual valve 60 and the oil passages 97 and 98.

The hydraulic pressure control line of the hydraulic control valve unit 7 is thus changed to adjust the clutch engagement pressure Pc by means of the clutch regulator valve 45, the line pressure solenoid 72 and the pressure modifier valve 73 after the forward clutch 25 comes into full engagement and by means of not only the clutch regulator valve 45, the line pressure solenoid 72 and the pressure modifier valve 73 but also the selector switching solenoid 70, the lock-up solenoid 71, the selector switching valve 75 and the selector control valve 80 before the forward clutch 25 comes into full engagement (e.g. during the engagement of the forward clutch 25 for vehicle starting) in the first embodiment. This makes it possible to adjust the clutch engagement pressure Pc more finely in a low hydraulic pressure range under the signal from the lock-up solenoid 71 during the engagement of the forward clutch 25.

The idle stop control unit 12 performs idle stop control (automatic engine stop/restart control) to decide on the idle stop or restart of the engine 11 based on the sensor detection signals and output an engine idle stop or restart signal to the CVT control unit 10 and the engine control unit 18.

Figure 3:
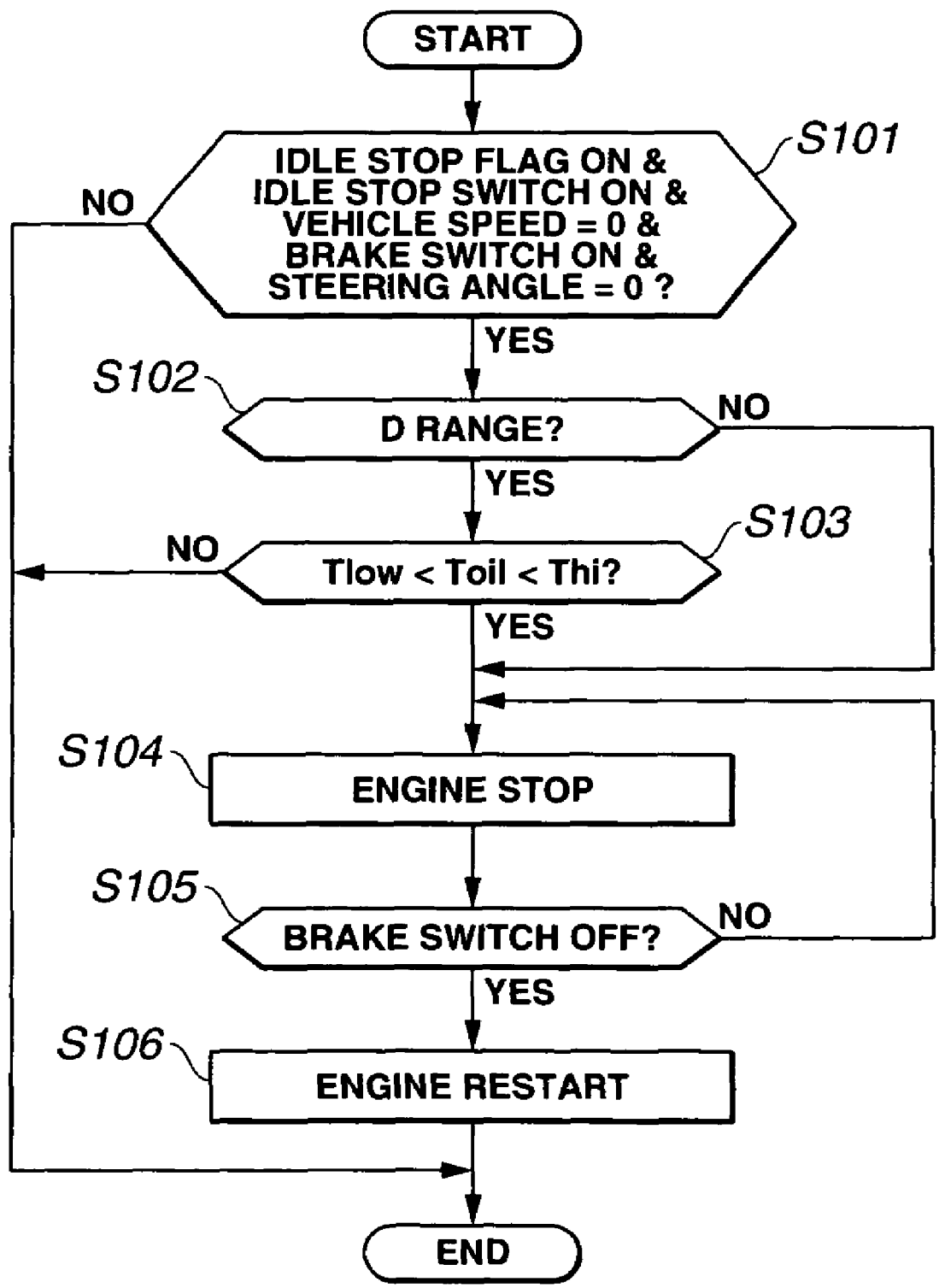
FIG. 3 is a flowchart for an idle stop control program of an idle stop control unit of the vehicle drive control system according to the first embodiment of the present invention.

The idle stop control of the idle stop control unit 12 is programmed in the following steps shown in FIG. 3 in the first embodiment.

At step S101, the idle stop control unit 12 determines whether the vehicle is in a state of satisfying all of the following idle stop conditions: (a) the idle stop flag is ON; (b) the idle stop switch 13 is ON; (c) the vehicle speed is zero; (d) the brake switch 15 is ON; and (e) the steering angle is zero. The idle stop flag is set and cleared according to the logics of other control operations. In the first embodiment, the idle stop flag is set OFF in the case where a desirable engine restart operation cannot be made, more specifically, e.g. when the forward clutch 25 cannot be engaged under the after-mentioned clutch engagement control or when the starter motor 19a cannot be driven due to insufficient battery charge. The idle stop switch 13 is energized upon ignition switch actuation and operated by a vehicle driver to indicate a driver's intention to execute and cancel the idle stop control. In other words, the idle stop control unit 12 decides on the idle stop of the engine 11 when the vehicle is in a stop state in which the execution of the idle stop control is requested by the vehicle driver with the brake pedal being held down and the steering angle being set to zero. Further, the idle stop condition (e) is set up to inhibit the idle stop of the engine 11 during a temporary stop e.g. at a right turn of the vehicle in the first embodiment. If all of the idle stop conditions (a) to (e) are satisfied (Yes at step S101), the control proceeds to step S102. The control is overridden if one or more of the idle stop conditions (a) to (e) are not satisfied (No at step S101).

At step S102, the idle stop control unit 12 determines whether the transmission device is placed in D range. If the transmission device is in D range (Yes at step S102), the control proceeds to step S103. The control proceeds to step S104 if the transmission device is in any other range (No at step S102).

At step S103, the idle stop control unit 10 determines whether the hydraulic oil temperature Toil is higher than a low temperature limit Tlow and lower than an upper temperature limit Thi, i.e., judges whether the transmission engagement element such as the start clutch 25 can be supplied with a sufficient engagement pressure. When the oil temperature Toil is not higher than the low temperature limit Tlow, there arises a possibility that the transmission engagement element cannot be supplied with a predetermined amount of hydraulic oil due to oil viscosity drag before the occurrence of complete combustion in the engine 11. The volumetric efficiency of the oil pump 8 decreases due to low oil viscosity drag and the valve leakage increases in a high oil temperature range. There thus arises a possibility that the transmission engagement element cannot be supplied with a predetermined amount of hydraulic oil due to such pump performance deterioration and valve leakage problems before the occurrence of complete combustion in the engine 11 when the oil temperature Toil exceeds the upper temperature limit Thi. If Tlow<Toil<Thi (Yes at step S103), the control proceeds to step S104. The control goes back to step S102 if the temperature condition of Tlow<Toil<Thi is not satisfied (No at step S103).

At step S104, the idle stop control unit 12 generates the idle stop signal and causes the engine control unit 18 to stop the engine 11.

At step S105, the idle stop control unit 12 determines whether the brake switch 15 is OFF, i.e., judges whether there is the driver's intention to restart the engine 1 on release of the brake pedal. If the brake switch 15 is turned off (Yes at step S15), the control then proceeds to step S106. If the brake switch 15 is turned on (No at step S15), the control goes back to step S104.

The idle stop control unit 12 is also programmed to judge that there is driver's intention to restart the engine 1 on de-energization of the idle stop switch 13 even when the brake switch 15 is ON. This makes it possible to cancel the idle stop control at the request of the vehicle driver in order to e.g. avoid a load on vehicle battery during the idle stop of the engine 11 and prevent an air conditioning system of the vehicle from becoming disabled even though the vehicle interior is hot. The vehicle drive control can be thus made more responsive to the driver's intention.

At step S106, the idle stop control unit 10 generates the engine restart signal and causes the engine control unit 18 to actuate the starter motor 19a and restart the engine 11.

The idle stop signal from the idle stop control unit 12 may also be outputted to a brake hill hold control mechanism of the vehicle in order to prevent the vehicle from rolling back on e.g. a slop during the idle stop of the vehicle.

The engine control unit 18 stops the idling of the engine 11 upon receipt of the engine idle stop signal and then actuates the starter motor 10a and thereby restarts the engine 11 upon receipt of the engine restart signal.

The starter motor drive control of the engine control unit 18 is programmed in the following steps shown in FIG. 10B in the first embodiment.

At step S400, the engine control unit 18 judges whether complete combustion has occurred in the engine 11. The method for judging the occurrence of complete combustion in the engine 11 is not particularly restricted. In the first embodiment, the judgment on the engine complete combustion is made by determining whether the engine speed Ne is higher than a given speed level. If the engine complete combustion has occurred (Yes at step S400), the control proceeds to step S420. If the engine complete combustion has not occurred (No at step S400), the control proceeds to step S410.

At step S410, the engine control unit 18 drives the starter motor 19a. The control then goes back to step S400.

At step S420, the engine control unit 18 stops the starter motor 19a. The control exits the program.

Herein, the oil pump 8 comes to a stop upon the idle stop of the engine 11. When the oil pump 8 stops, the hydraulic oil drops out of the oil passages of the hydraulic control valve unit 7 to cause decreases in the clutch engagement pressure Pc and the pulley clamping pressures Ppri and Psec. The forward clutch 25 becomes disengaged due to such a decrease in the clutch engagement pressure Pc during the engine idle stop. It is accordingly preferable to supply a predetermined amount of hydraulic oil to the forward clutch 25 and control the clutch engagement pressure Pc to a desired level at the time of an engine restart after an idle stop. It should be noted that the hydraulic control valve unit 7 is designed to secure a certain hydraulic pressure in each pulley cylinder chamber 33, 37 without significant oil drainage when the engine 11 stops for a short time under the idle stop control and to drain hydraulic oil gradually from the oil passages to the pulley cylinder chambers 33, 37 when the engine 11 stops for a long time.

The CVT control unit 10 thus enables the torque transmission controller 10a to perform clutch engagement control to determine a target clutch engagement pressure Pc* based on the accelerator opening θ and control the hydraulic control valve unit 7 to adjust the forward clutch engagement pressure Pc to the target clutch engagement pressure Pc* for proper engagement of the forward clutch 25 at the restart of the engine 11. The CVT control unit 10 also enables the torque transmission controller 10a to perform so-called torque-down control, in tandem with the clutch engagement control, to reduce engine torque output Te according to the engagement state of the forward clutch 25 and prevent excessive torque input to the automatic transmission device.

It is herein assumed that the forward clutch 25 comes into engagement through the following phases: a precharge phase during which a clutch piston stroke is started to push clutch plates against the biasing force of a disc spring and eliminate play between the clutch plates; an engagement phase during which the clutch piston stroke is coming to an end so that the clutch plates are engaged to allow torque transmission with clutch disc slippage; an engagement termination phase during which the clutch plate slippage is not minimized or eliminated even after the expiration of a predetermined time period; and then, a full engagement phase during which the clutch discs are fully engaged to allow torque transmission with no clutch plate slippage.

In particular, the clutch engagement and torque-down controls of the torque transmission controller 10a during the forward clutch engagement phase is programmed in the following steps shown in FIG. 10A in the first embodiment.

At step S100, the torque transmission controller 10a first determines a target clutch engagement time Δt* of the forward clutch 25 based on the accelerator opening θ.

At step S200, the torque transmission controller 10a next determines a target clutch engagement torque Tc* of the forward clutch 25, which corresponds to the target clutch engagement pressure Pc*, based on the accelerator opening θ and the target clutch engagement time Δt*.

At step S300, the torque transmission controller 10a then determines a target engine torque Te* based on the target clutch engagement torque Tc*.

The torque transmission controller 10a then generates control signals responsive to these control signals to control the operations of the hydraulic control valve unit 7 and the engine control unit 18.

In this way, the torque transmission controller 10a is configured to determine the target clutch engagement time Δt* and the target clutch engagement torque Tc* based on the accelerator opening θ and cause the hydraulic control valve unit 7 to control the engagement state of the forward clutch 25 according to the target clutch engagement time Δt* and the target clutch engagement torque Tc* in such a manner as to bring the forward clutch 25 into engagement during a lapse of the clutch engagement time Δt*. The target clutch engagement time Δt* and the target clutch engagement torque Tc* are determined based on the accelerator opening θ until the forward clutch 25 comes into full engagement. It is therefore possible according to the first embodiment to control a driving force of the vehicle, which generally depends on the torque capacity Tc of the forward clutch 25, in response to changes in the accelerator opening θ and allow the vehicle to make a smooth start without causing driver discomfort.

The vehicle inertia becomes suddenly exerted upon full engagement of the forward clutch 25. If the engine torque Te has not increased to compare favorably with the vehicle inertia at the time of full engagement of the forward clutch 25, the vehicle cannot attain a sufficient driving force. The engine speed Ne becomes once decreased and then increased to a desired level under such an insufficient engine torque condition. This results in vehicle shaking. Further, the transient target clutch engagement torque Tc* is inevitably smaller than the final target clutch engagement torque Tcf* so that the target engine torque Te* is smaller during a transient period before the full engagement of the forward clutch 25 than after the full engagement of the forward clutch 25. If the forward clutch 25 comes into full engagement during such a transient period, there arises vehicle shaking due to insufficient engine torque.

In the first embodiment, however, the forward clutch 25 can be prevented from coming into full engagement during a transient period before the expiration of the clutch engagement time Δt*. This makes it possible to avoid the occurrence of vehicle shaking due to insufficient engine torque and provide improved driving comfort.

The torque transmission controller 10a is further configured to determine the target engine torque Te* based on the target clutch engagement torque Tc* such that the target engine torque Te* gradually increases with the target clutch engagement torque Tc*, and then, cause the engine control unit 18 to control the operations of the engine 11 according to the target engine torque Te*. This makes it possible to secure a sufficient engine torque Te for vehicle driving at the time of full engagement of the forward clutch 25 without lengthening the clutch engagement time.

More specifically, the torque transmission controller 10a of the CVT control unit 10 is structured as follows.

Figure 4:
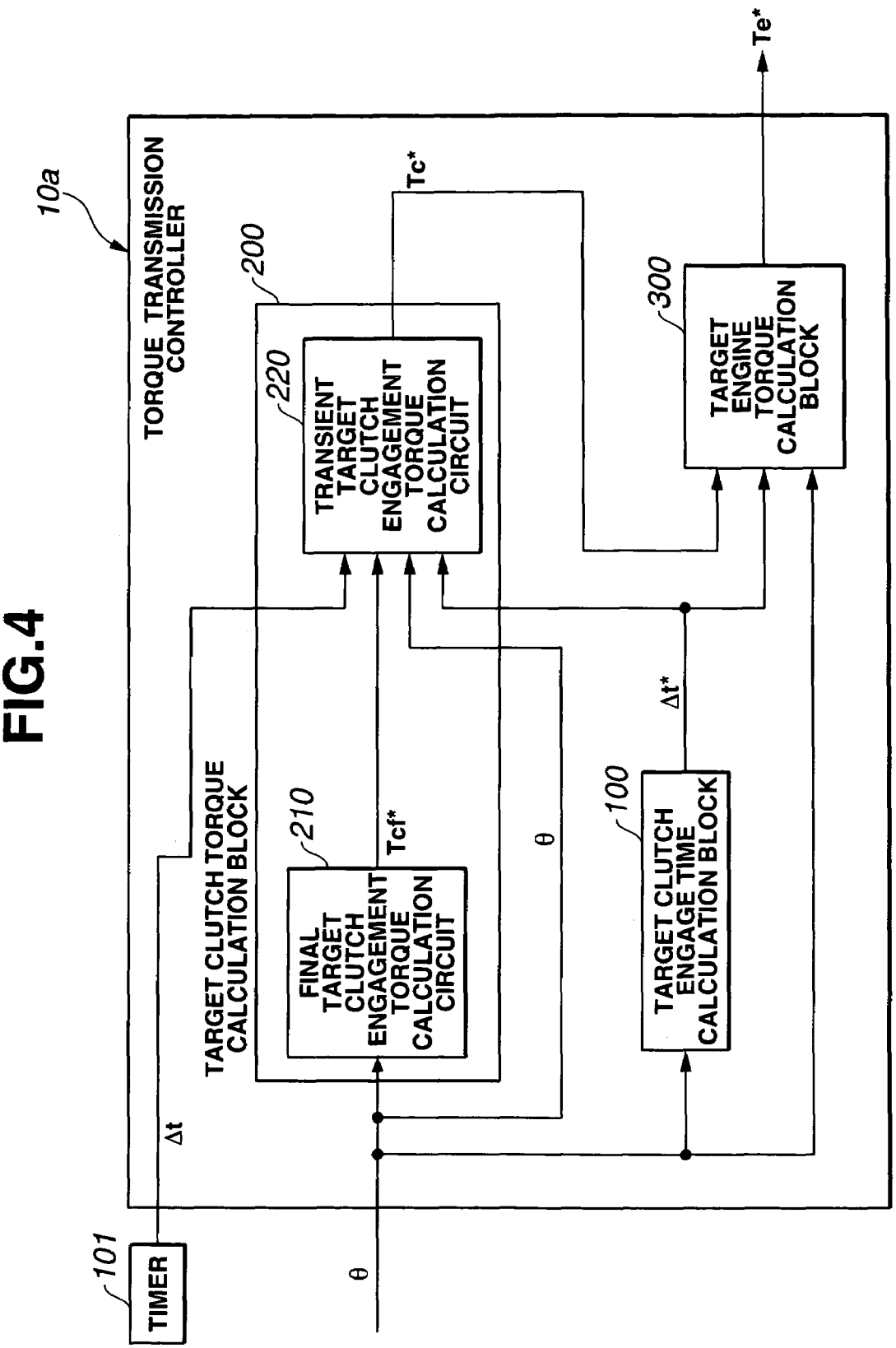
FIG. 4 is a schematic diagram of a torque transmission controller of a transmission control unit of the vehicle drive control system according to the first embodiment of the present invention.

As shown in FIG. 4, the torque transmission controller 10a includes a target clutch engagement time calculation block 100, a target clutch torque calculation block 200, a target engine torque calculation block 300 and a timer 101.

The target clutch engagement time calculation block 100 calculates the target engagement time Δt* of the forward clutch 25 (i.e. the time from the initiation of the clutch precharge phase to the completion of the clutch engagement phase) based on the accelerator opening θ, and then, outputs the target clutch engagement time Δt* to the transient target clutch torque calculation circuit 220. Herein, the target clutch engagement time calculation block 100 may also serve as the after-mentioned target clutch engagement time setting portion 314a of the engine torque calculation block 300.

The target clutch torque calculation block 200 has a final target clutch engagement torque calculation circuit 210 and a transient target clutch engagement torque calculation circuit 220 as shown in FIG. 4.

Figure 5:
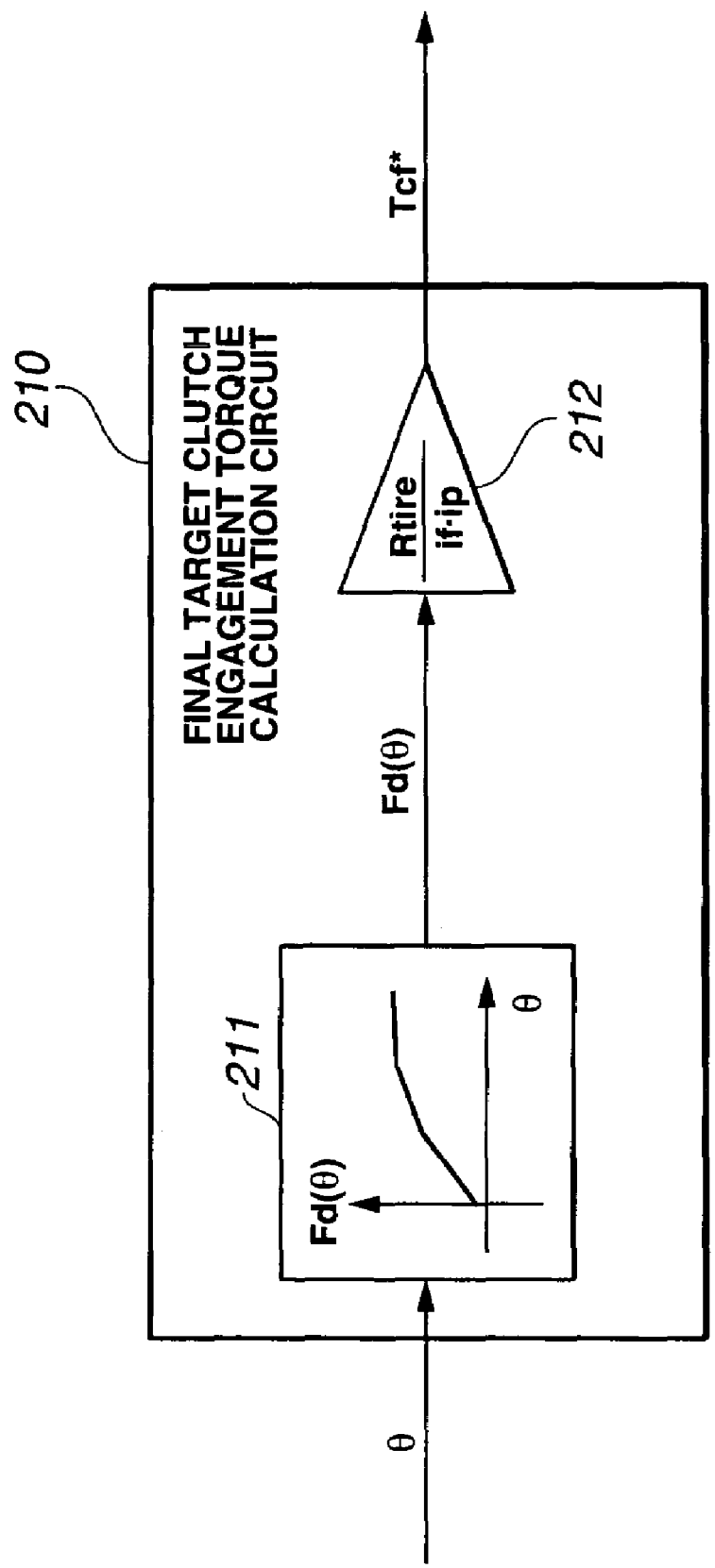
FIG. 5 is a configuration diagram of a final target clutch engagement torque calculation circuit of a target clutch torque calculation block of the torque transmission controller according to the first embodiment of the present invention.

As shown in FIG. 5, the final target clutch engagement torque calculation circuit 210 has a target driving force setting section 211 and a final target clutch engagement torque calculation section 212 as shown in FIG. 5.

The target driving force setting section 211 stores therein a target driving force setting map to set a target driving force Fd(θ) based on the accelerator opening θ.

The final target clutch engagement torque calculation section 212 calculates the final target engagement torque Tcf* of the forward clutch 25 to be achieved at the time of completion of the clutch engagement phase by multiplying the target driving force Fd(θ) by a wheel radius Rtire and dividing the multiplication result by a primary gear ratio Ip and a final gear ratio If to, and then, outputs the final target clutch engagement torque Tcf* to the transient target clutch engagement torque calculation circuit 220.

Figure 6:
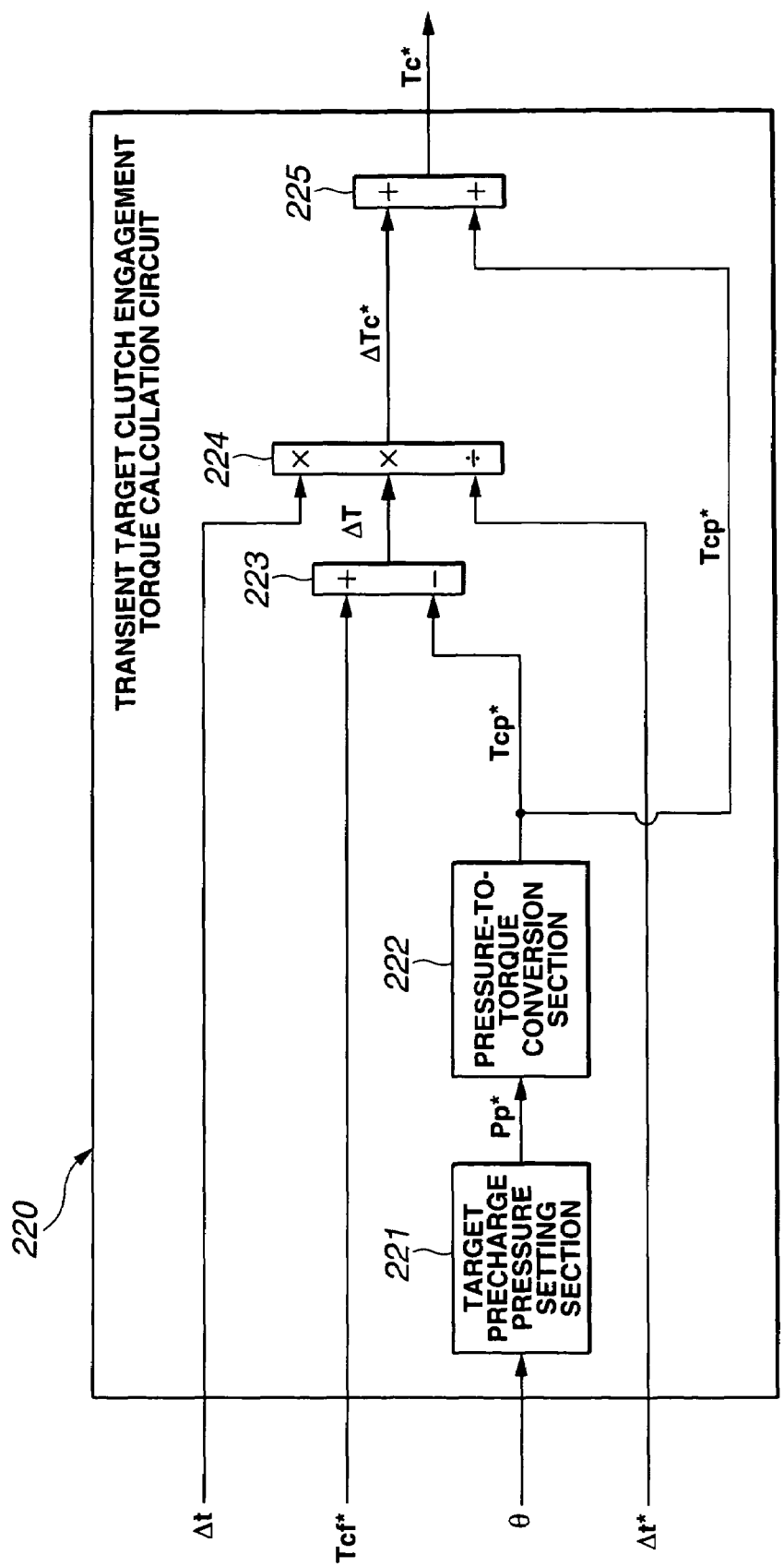
FIG. 6 is a configuration diagram of a transient target clutch engagement torque calculation circuit of the target clutch torque calculation block of the torque transmission controller according to the first embodiment of the present invention.

As shown in FIG. 6, the transient target clutch engagement torque calculation circuit 220 has a target precharge pressure setting section 221, a pressure-to-torque conversion section 222, a first adding section 223, a multiplication section 224 and a second adding section 225.

The target precharge pressure setting section 221 sets a target precharge pressure Pp* of the forward clutch 25 (i.e. a target value of the hydraulic pressure supplied to the forward clutch 25 during the clutch precharge phase to make a clutch piston stroke for clutch play elimination) based on the accelerator opening θ and outputs the target precharge pressure Pp* to the pressure-to-torque conversion section 222.

The pressure-to-torque conversion section 222 converts the target clutch precharge pressure Pp* into a target clutch precharge torque Tcp* and outputs the target precharge torque Tcp* to the first and second adding sections 223 and 225.

The first adding section 223 inverts the sign of the target precharge torque Tcp* and calculates a difference ΔT between the final target clutch torque Tcf* and the target precharge torque Tcp* (ΔT=Tcf*−Tcp*). Since the target clutch precharge torque Tcp* corresponds to a torque of the forward clutch 25 for clutch play elimination during the precharge phase, the torque difference ΔT corresponds to a substantial target engagement torque of the forward clutch 25 for torque transmission.

The multiplication section 224 determines a target clutch torque increment ΔTc* by multiplying the torque difference ΔT by the time Δt lapsed during the clutch engagement phase (measured by the timer 101) and dividing the multiplication result by the target clutch engagement time Δt* and outputs the target incremental clutch torque ΔTc* to the second adding section 225.

The second adding section 225 adds the target incremental clutch torque ΔTc* to the target clutch precharge torque Tcp* to determine the target engagement torque Tc* of the forward clutch 25 to be achieved during the transient period before the completion of the clutch engagement phase (i.e. during the clutch engagement and engagement termination phases where the clutch plates are gradually engaged), and then, outputs the transient target clutch engagement torque Tc* to the target engine torque calculation block 300.

Figure 11:
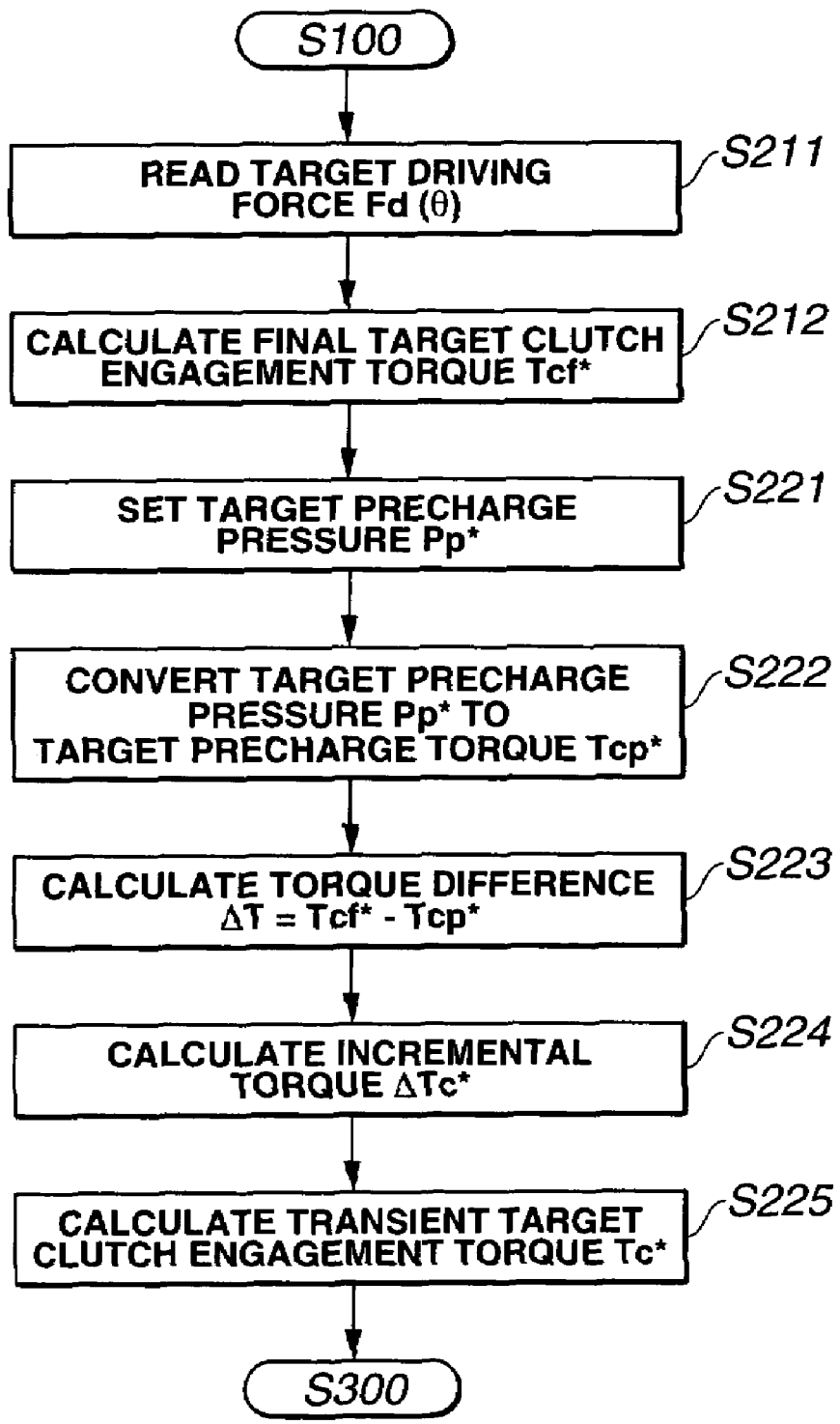
FIG. 11 is a flowchart for a target clutch torque calculation program of the target clutch torque calculation block according to the first embodiment of the present invention.

The calculation of the target clutch torque Tc* is done by the target clutch torque calculation block 200 through the following steps as shown in FIG. 11.

At step S211, the target driving force setting section 211 reads the target driving force Fd(θ) from the target driving force setting map with reference to the accelerator opening θ. The control proceeds to step S211.

At step S212, the final target clutch engagement torque calculation section 212 calculates the final target clutch engagement torque Tcf* based on the target driving force Fd(θ), the wheel radius Rtire, the primary gear ratio Ip and the final gear ratio If. The control proceeds to step S221.

At step S221, the target precharge pressure setting section 221 sets the target clutch precharge pressure Pp* based on the accelerator opening θ. The control proceeds to step S222.

At step S222, the pressure-to-torque conversion section 222 converts the target clutch precharge pressure Pp* into the target clutch precharge torque Tcp*. The control proceeds to step S223.

At step S223, the first adding section 223 calculates the torque difference ΔT between the final target clutch engagement torque Tcf* and the target clutch precharge torque Tcp* (ΔT=Tcf*−Tcp*).

At step S224, the multiplication section 224 calculates the target incremental clutch torque ΔTc* based on the torque difference ΔT, the lapsed time Δt and the target clutch engagement time Δt* (ΔTc*=ΔT×Δt2/Δt*).

At step S225, the second adding section 225 determines the transient target clutch engagement torque Tc* based on the target incremental clutch torque ΔTc* and the target clutch precharge torque Tcp* (Tc*=Tcp*+ΔTc*).

The target engine torque calculation block 300 determines the target engine torque Te* based on the target clutch torque Tc* in such a manner that the target engine torque Te* changes depending on the accelerator opening θ without exceeding the maximum transmissible torque of the forward clutch 25, and has a target feedforward torque calculation circuit 310, a target feedback torque calculation circuit 320 and an adding section 330 as shown in FIG. 7.

The target feedforward torque calculation circuit 310 calculates a target feedforward engine torque Te* (FF) from the target clutch torque Tc*, the target clutch engagement time Δt*, the engine speed Ne and the primary pulley rotation speed Npri and outputs the target feedforward engine torque Te* (FF) to the adding section 330.

The target feedback torque calculation circuit 320 calculates a target feedback engine torque Te* (FB) from the target clutch engagement time Δt*, the primary pulley rotation speed Npri, the turbine speed Ntb and the turbine speed drop flag Ftb and outputs the target feedback engine torque Te* (FB) to the adding section 330.

The adding section 330 determines a target engine torque Te* by superimposing (adding) the target feedforward engine torque Te* (FF) on the target feedback engine torque Te* (FB) and outputs the target engine torque Te* to the engine control unit 18, and then, outputs the target engine torque Te* to the engine control unit 18.

Figure 12:
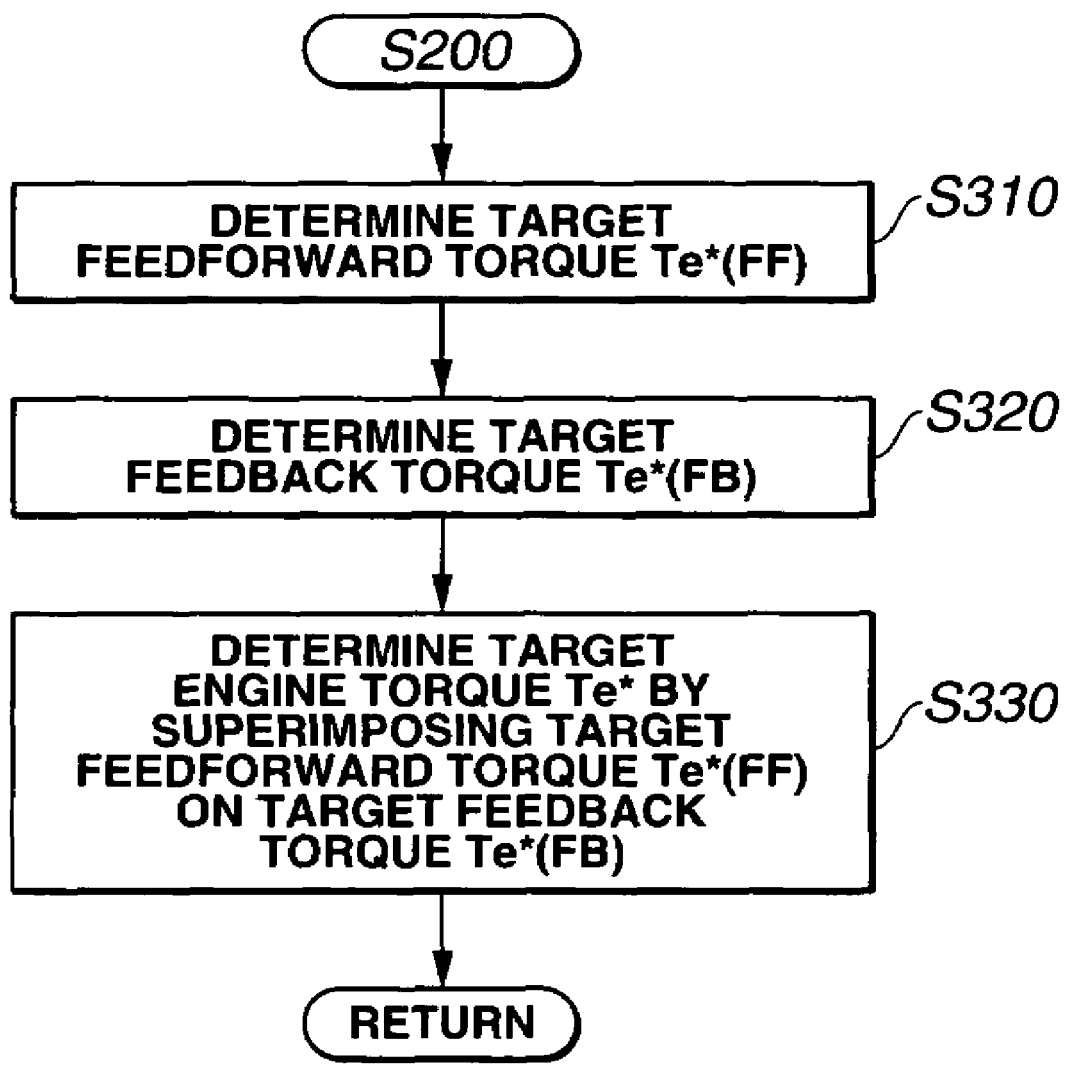
FIG. 12 is a flowchart for a target engine torque calculation program of the target engine torque calculation block according to the first embodiment of the present invention.

The calculation of the target engine torque Te* is consequently done by the target engine torque calculation block 300 through the following steps as shown in FIG. 12.

At step S310, the target feedfoward torque calculation circuit 310 calculates the target feedforward engine torque Te* (FF) based on the target clutch torque Tc*, the target clutch engagement time Δt*, the engine speed Ne and the primary pulley rotation speed Npri.

At step S320, the target feedback engine torque calculation circuit 320 calculates the target feedback engine torque Te* (FB) based on the target clutch engagement time Δt*, the primary pulley rotation speed Npri, the turbine speed Ntb and the turbine speed drop flag Ftb.

At step S330, the adding section 330 calculates the target engine torque Te* by superimposing the target feedforward engine torque Te* (FF) on the target feedback engine torque Te* (FB) and outputs the target engine torque Te*.

In the first embodiment, the target feedforward torque calculation circuit 320 has a speed ratio setting section 311, a torque ratio setting section 312, a multiplication section 313, a torque corrector section 314 and an adding section 315 as shown in FIG. 8A.

The speed ratio setting sections 311 sets a speed ratio e(t) (=Npri/Ne) by dividing the primary pulley rotation speed Npri by the engine speed Ne and outputs the speed ratio e(t) to the torque ratio setting section 312.

The torque ratio setting section 312 stores therein a torque ratio setting map to set a torque ratio tr of the torque converter 1 based on the speed ratio e(t) and outputs the torque ratio tr to the multiplier 313.

The multiplication section 313 determines a transient target engine torque Tet* by multiplying the target clutch torque Tc* by the torque ratio tr and outputs the transient target engine torque Tet* to the adding section 315.

The torque corrector section 314 calculates a torque correction amount ΔTe based on the accelerator opening θ and outputs the torque correction amount ΔTe to the adding section 315. The torque correction amount ΔTe is set to make a correction to the target engine torque in view of the clutch engagement speed and thereby avoid the occurrence of shaking or shock in the vehicle upon abrupt engagement of the forward clutch 25. The torque corrector section 314 includes a target clutch engagement time setting portion 314a and a torque correction amount setting portion 314b as shown in FIG. 8B. The target clutch engagement time setting portion 314a stores therein a target clutch engagement setting map to set the target clutch engagement time Δt* based on the accelerator opening θ, whereas the torque correction amount setting portion 314 stores therein a torque correction amount setting map to set the torque correction amount ΔTe based on the target clutch engagement time Δt* in view of the clutch engagement speed.

The adding section 315 adds the torque correction amount ΔTe to the transient target engine torque Tet* to determine the target feedforward engine torque Te* (FF), and then, outputs the target feedforward torque Te* (FF) to the adding section 330.

It is conceivable to use as the speed ratio e(t) a turbine/engine speed ratio of Ntb/Ne in place of the pulley/engine speed ratio Npri/Ne for calculation of the target feedforward torque Te* (FF). However, the torque capacity Tc of the forward clutch 25 is small soon after the restart of the engine 11. The rotation speed Ntb of the turbine 1a, which is located on the input side of the forward clutch 25, follows the engine speed Ne so that the turbine/engine speed ratio Ntb/Ne becomes nearly 1 soon after the engine restart. Accordingly the torque ratio tr becomes so small that the target engine torque Te* takes a large value when the turbine/engine speed ratio Ntb/Ne is used as the speed ratio e(t). There is no choice but to raise the engine speed Ne and adjust the engine torque Te to such a large target value Te. This results in a large vehicle starting time lag.

In the first embodiment, however, the pulley/engine speed ratio Npri/Ne is used as the speed ratio e(t). The rotation speed Npri of the primary pulley 30a, which is located on the output side of the forward clutch 25, is low soon after the restart of the engine 11 so that the speed ratio e(t) takes a small value to secure a large torque ratio tr and a smaller target engine torque Te*. This makes it possible to avoid a vehicle starting time lag due to an engine speed response delay soon after the engine restart.

Figure 13:
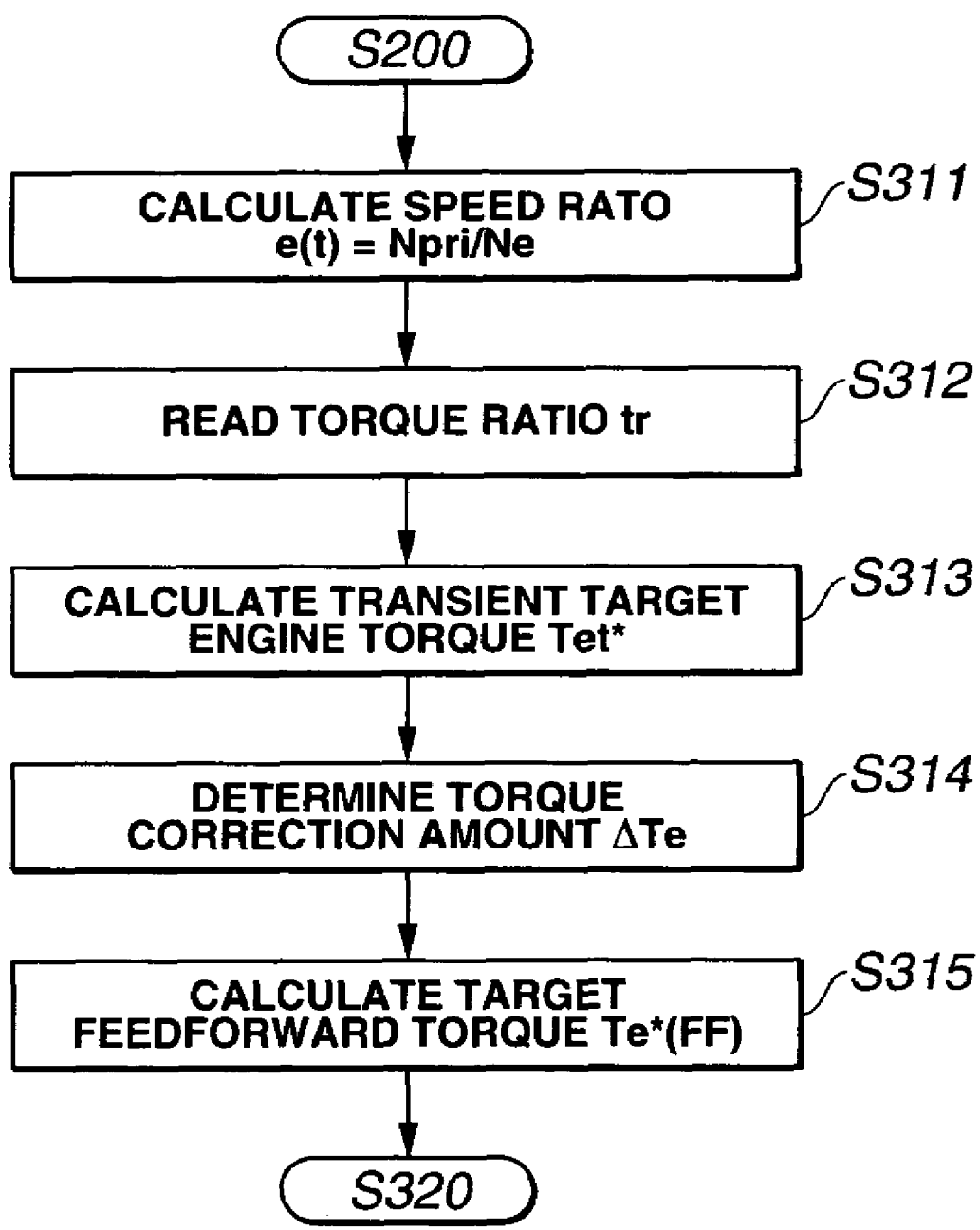
FIG. 13 is a flowchart for a target feedforward engine torque calculation program of the target feedforward torque calculation circuit of the target engine torque calculation block according to the first embodiment of the present invention.

The calculation of the target feedforward engine torque Te* (FF) is done by the target feedforward torque calculation circuit 310 through the following steps as shown in FIG. 13.

At step S311, the speed ratio setting sections 311 calculates the speed ratio e(t) from the engine speed Ne and the primary pulley rotation speed Npri. The control proceeds to step S312.

At step S312, the torque ratio setting section 312 reads the torque ratio tr from the torque ratio setting map with reference to the speed ratio e(t). The control proceeds to step S313.

At step S313, the multiplication section 313 calculates the transient target engine torque Tet* from the target clutch torque Tc* and the torque ratio tr. The control proceeds to step S314.

At step S314, the torque corrector section 314 determines the torque correction amount ΔTe based on the accelerator opening θ in view of the torque engagement speed. The control proceeds to step S315.

At step S315, the adding section 315 calculates the target feedforward engine torque Te* (FF) from the torque correction amount ΔTe and the transient target engine torque Tet*. The control proceeds to step S320.

Figure 9:
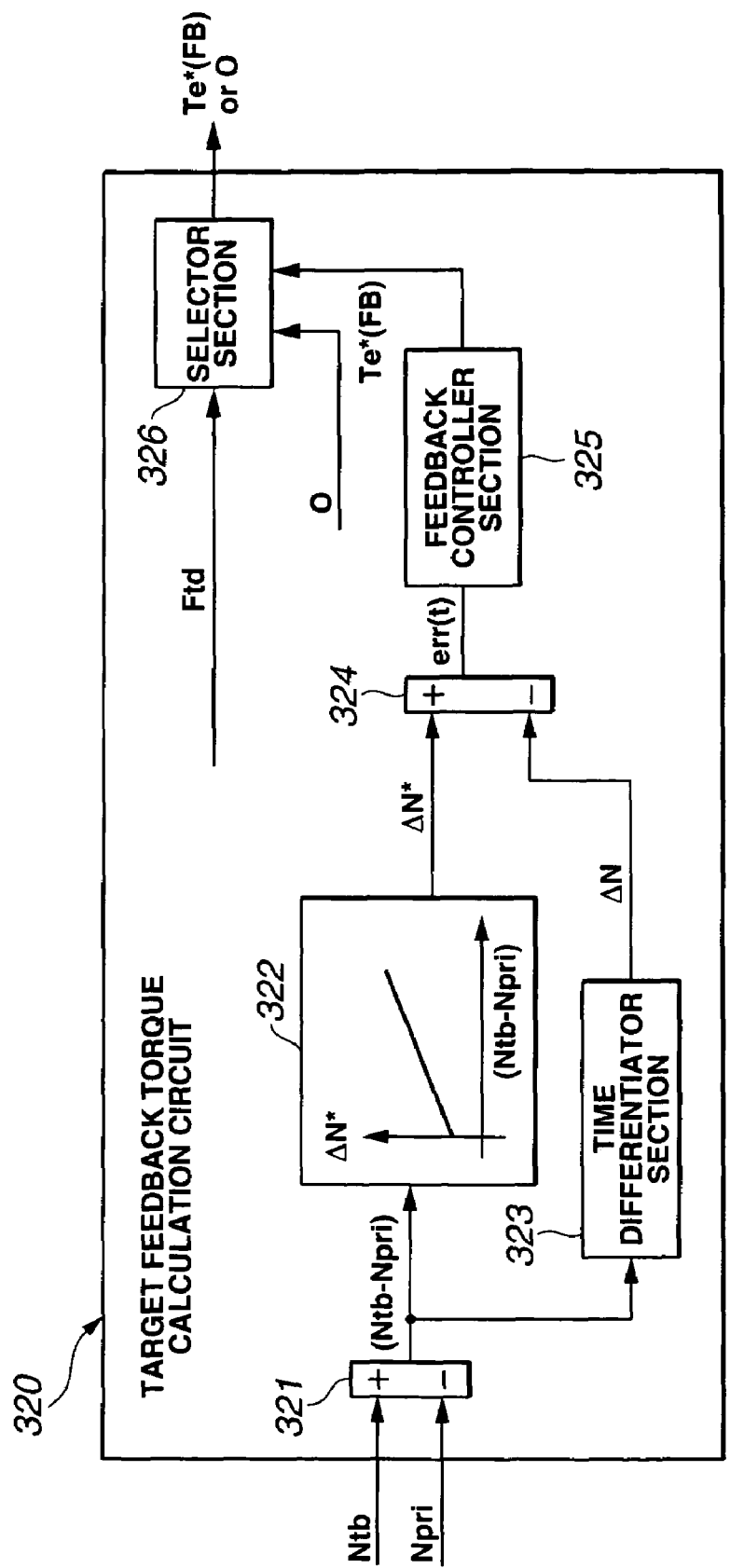
FIG. 9 is a configuration diagram of a target feedback torque calculation circuit of the target engine torque calculation block according to the first embodiment of the present invention.

As shown in FIG. 9, by contrast, the feedback torque calculation circuit 320 has an actual speed difference calculating section 321, a target differential speed change rate calculating section 322, a time differentiator section 323, a subtractor section 324, a feedback controller section 325 and a selector section 326.

The speed difference calculating section 321 calculates an actual difference between the turbine speed Ntb and the primary pulley rotation speed Npri and outputs the speed difference (Ntb−Npri) to the target differential speed change rate calculating section 322 and the time differentiator section 323.

The target differential speed change rate calculating section 322 stores therein a target speed change rate setting map to set a target speed change rate ΔN* based on the speed difference (Ntb−Npri) and outputs the target speed change rate ΔN* to the subtractor section 324. In the target differential speed change rate setting map, the target speed change rate ΔN* is defined with respect to the actual speed difference (Ntb−Npri) such that the target speed change rate ΔN* increases with decrease in the actual speed difference (Ntb−Npri) and decreases with increase in the actual speed difference (Ntb−Npri). When the actual speed difference (Ntb−Npri) is so large as to result in high clutch heat generation, the target speed change rate ΔN* is set to a low valve in order to allow quick engagement of the forward clutch 25 and thereby limit total heat generation in the forward clutch 25 for prevention of clutch durability deterioration. On the other hand, the target speed change rate ΔN* is set to a high valve in order to allow gradual engagement of the forward clutch 25 and thereby avoid clutch engagement shock when the actual speed difference (Ntb−Npri) is small.

The time differentiator section 323 calculates from the actual speed difference (Ntb−Npri) an actual speed change rate ΔN corresponding to the target clutch engagement time Δt* and outputs the actual speed change rate ΔN to the subtractor section 324.

The subtractor section 324 calculates a difference err(t) between the actual speed change rate ΔN and the target speed change rate ΔN* and outputs the speed change rate difference err(t) to the feedback controller section 325.

The feedback controller section 325 calculates a target feedback engine torque Te* (FB) based on the accelerator opening θ in such a manner that the engine torque Te follows the accelerator opening θ and outputs the target feedback engine torque Te* (FB) to the selector section 326.

The selector section 326 selects either the target feedback engine torque Te* (FB) or zero depending on the turbine speed drop flag Ftb and outputs the selected torque value of Te* (FB) or 0 to the adding section 330.

Herein, the turbine speed drop flag Ftb is set to 1 when the turbine speed Ntb is higher than or equal to a given threshold value Nα and the turbine speed differentiation result ΔNtb is negative and set to 0 so as to allow zero output at other times. When the turbine speed Ntb is higher than or equal to the threshold value Nα and the turbine speed differentiation result ΔNtb is negative, the turbine speed Ntb decreases with increase in the engine speed Ne. It means that clutch plate slippage occurs in the forward clutch 25. If it takes a longer time to bring the forward clutch 25 into full engagement in such a case, the amount of heat generated in the forward clutch 25 due to clutch plate slippage becomes increased to cause a deterioration of the durability of the forward clutch 25. If the forward clutch 25 is engaged abruptly, by contrast, there arises vehicle shaking to cause driver's discomfort due to clutch engagement shock. In the first embodiment, the target feedback engine torque Te* (FB) is outputted so as to perform feedback control on the engine torque Te according to the accelerator opening θ when the turbine speed drop flag Ftb is set to 1. The turbine speed Ntb can be thus decreased promptly by determining the target engine torque Te* and the target clutch torque Tc* based on the same control parameter Δt* in the case where there is a possibility that it takes a long time to engage the forward clutch 25. This makes it possible to prevent the durability of the forward clutch 25 from becoming deteriorated due to slow engagement of the forward clutch 25 and to avoid the occurrence of clutch engagement shock due to abrupt engagement of the forward clutch 25. The zero output is produced when the turbine speed drop flag Ftb is set to 0.

Figure 14:
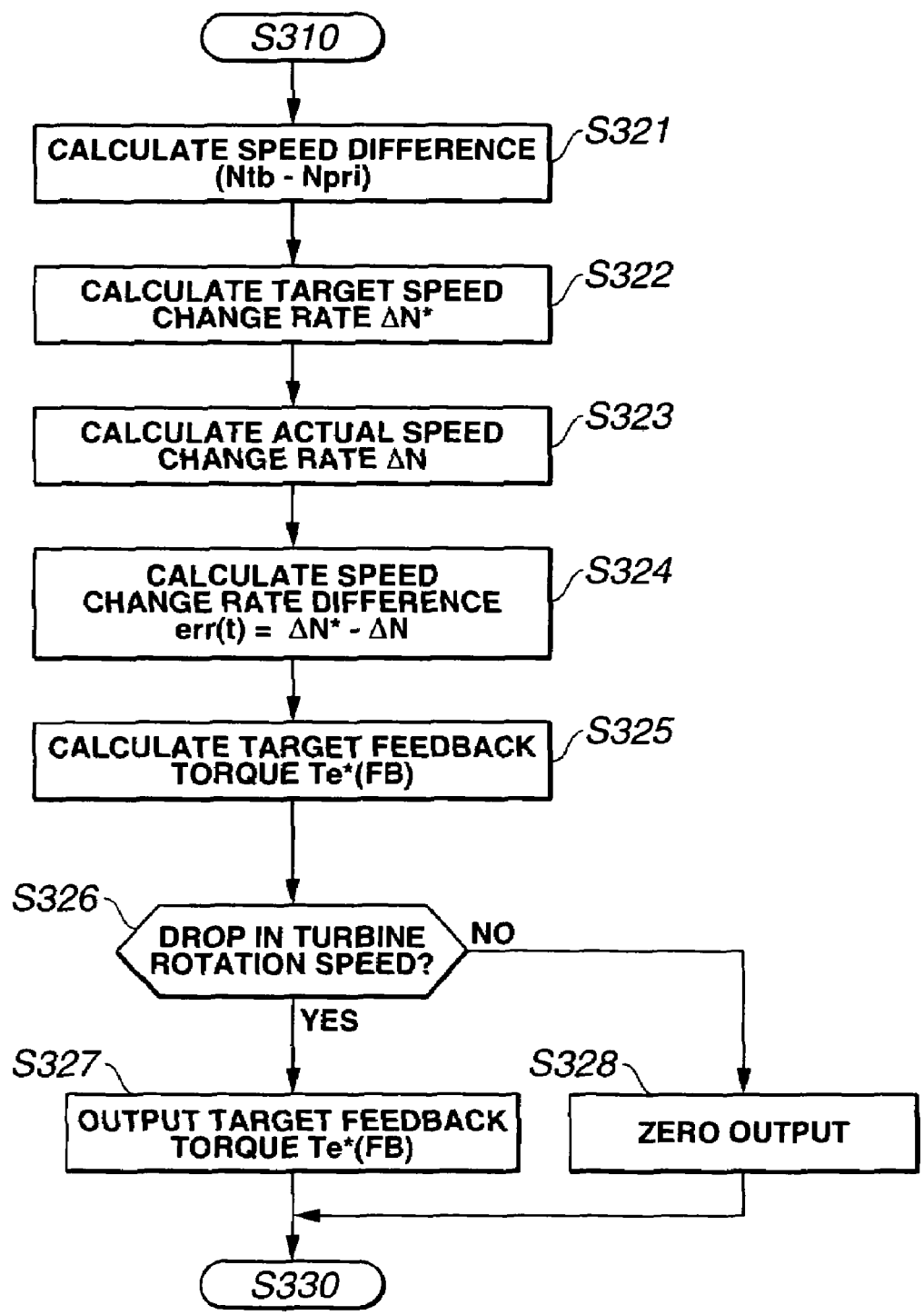
FIG. 14 is a flowchart for a target feedback engine torque calculation program of the target feedback torque calculation circuit of the target engine torque calculation block according to the first embodiment of the present invention.

The calculation of the target feedback engine torque Te* (FB) is consequently done by the target feedback torque calculation circuit 320 through the following steps as shown in FIG. 14.

At step S321, the speed difference calculating section 321 calculates the difference between the turbine speed Ntb and the primary pulley rotation speed Npri. The control proceeds to step S322.

At step S322, the target differential speed change rate calculating section 322 calculates the target speed change rate ΔN* based on the speed difference (Ntb−Npri) with reference to the target speed change rate setting map. The control proceeds to step S323.

At step S323, the time differentiator section 323 calculates the actual speed change rate ΔN from the speed difference (Ntb−Npri). The control proceeds to step S324.

At step S324, the subtractor section 324 calculates the difference err(t) between the actual speed change rate ΔN and the target speed change rate ΔN*. The control proceeds to step S325.

At step S325, the feedback controller section 325 calculates the target feedback engine torque Te* (FB) based on the accelerator opening θ. The control proceeds to step S326.

At step S326, the selector section 326 determines whether the turbine speed drop flag Ftb is set to 1. If Ftb=1 (Yes at step S326), the control proceeds to step S327. If Ftb=0 (No at step S326), the control proceeds to step S328.

At step S327, the selector section 326 outputs the target feedback engine torque Te* (FB). The control proceeds to step S330.

At step S327, the selector section 326 produces zero output. The control proceeds to step S330.

The torque transmission controller 10a is configured to set the target engine torque Tep* to a level corresponding to the target clutch precharge torque Tcp* so as to limit the engine output Te to the target clutch precharge torque level during the forward clutch precharge phase, and then, to keep the target engine torque Te* constant so as to cancel the clutch plate slip gradually and promptly during the forward clutch engagement termination phase. The engine torque Te may alternatively be decreased during the forward clutch engagement termination phase. The torque transmission controller 10a is further configured to, at the time of controlling the hydraulic control valve unit 7 to switch its hydraulic pressure control line upon full engagement of the forward clutch 25, decrease the amount of torque-down control on the engine torque Te gradually until the engine torque Te reaches a given degree in order to avoid the occurrence of belt slippage in the CVT 3 due to abrupt torque input.

Figure 15:
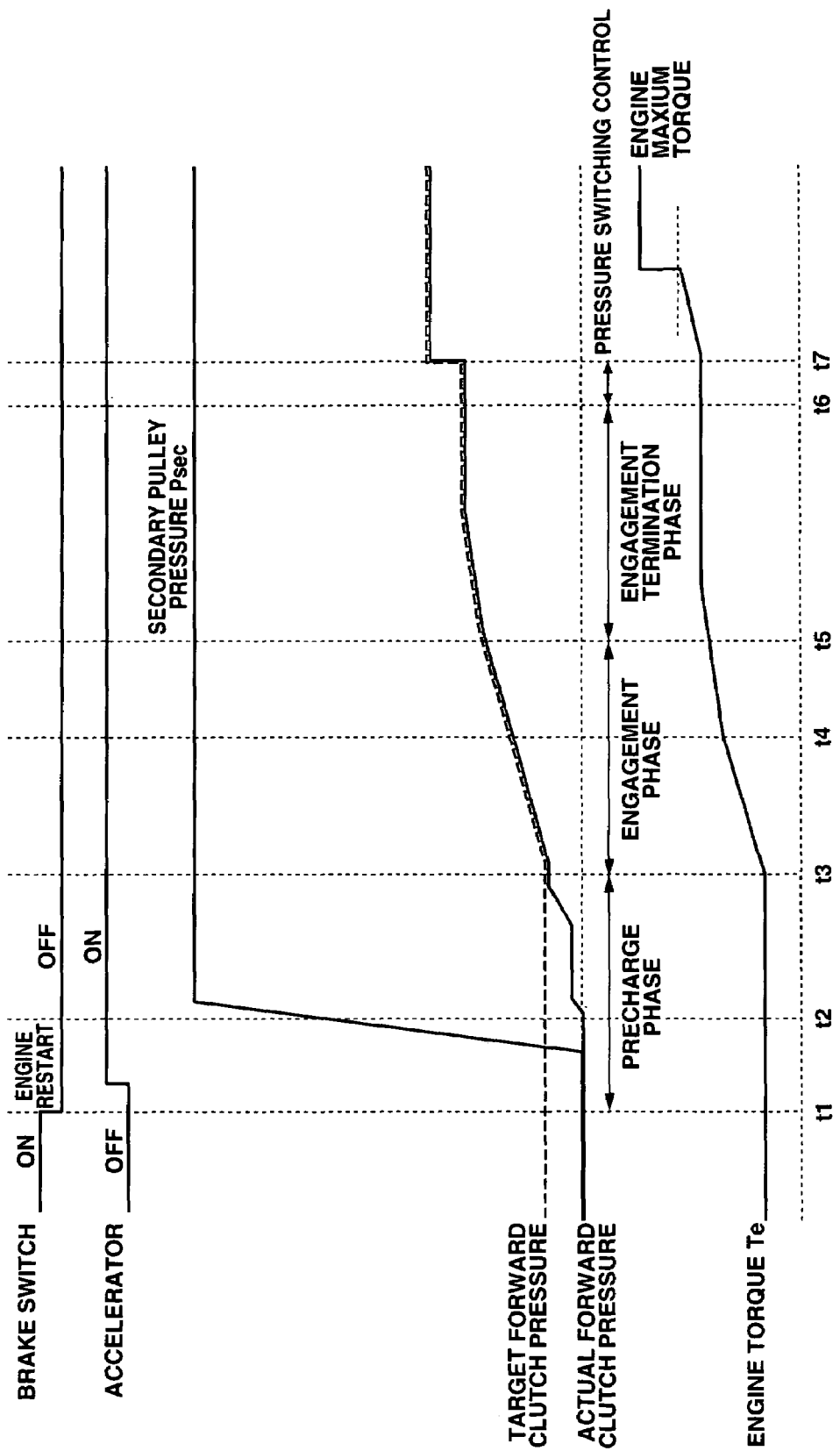
FIGS. 15 and 16 are time charts for torque control of the vehicle drive control system according to the first embodiment of the present invention.

The engine torque control of the first embodiment is effected as follows as shown in FIG. 15.

At time t1, the supply of hydraulic oil to the forward clutch 25 is allowed in preparation for engine restart upon a driver's brake pedal releasing operation. The forward clutch 25 shifts into the precharge phase at this time.

Between time t1 and time t2, the secondary pulley clamping pressure Psec starts increasing by accelerator pedal actuation. The forward clutch 25 remains in the precharge phase during the time period between t1 and t2. The actual hydraulic pressure Pc of the forward clutch 25 is controlled to the target start clutch pressure Pp* (i.e. the torque Tc of the forward clutch 25 is controlled to the target precharge torque Tp*) according to the accelerator opening θ. Further, the forward clutch 25 is hardly capable of torque transmission in the precharge phase. The engine torque Te is thus limited to the target forward clutch precharge torque level.

At time t2, the actual hydraulic pressure Pc of the forward clutch 25 starts increasing toward the target clutch pressure Pc*.

Between time 2 and time 3, the actual hydraulic pressure Pc of the forward clutch 25 still keeps on increasing toward the target clutch pressure Pc*. The engine torque Te does not increase during this time period between t2 and t3. The secondary pulley clamping pressure Psec reaches its target level and is held constant at the target level after that time.

At time t3, the forward clutch 25 completes its piston stroke for clutch play elimination and shifts into the engagement phase. The torque transmission controller 10a starts its engine torque controls to calculate the target clutch engagement time Δt* based on the accelerator opening θ, calculate the target clutch torque Tc* based on the target clutch engagement time Δt* and then calculate the target engine torque Te* based on the target clutch engagement time Δt* and the target clutch torque Tc*.

Between time t3 and time t4, the actual hydraulic pressure Pc of the forward torque 25 gradually increases so as to control the engagement torque Tc of the forward clutch 25 to the target clutch torque Tc*. Further, the clutch plate slippage condition of Ntb≧Nα and ΔNtb<0 is not yet satisfied so that the turbine speed drop flag Ftb is set to 0 during this time period between t3 and t4. Thus, the target engine torque Te* becomes equal to the target feedforward engine torque Te* (FF) since the output of the target feedback engine torque Te* (FB) is not allowed. The engine torque Te starts increasing to the target engine torque Te* so as not to exceed the maximum transmissible torque of the forward clutch 25.

At time t4, the actual hydraulic pressure Pc of the forward torque 25 keeps on increasing so as to control the engagement torque Tc of the forward clutch 25 to the target clutch torque Tc*. The turbine speed drop flag Ftb is set to 1 to allow the output of the target feedback engine torque Te* (FB) upon satisfaction of the clutch plate slippage condition of Ntb≧Nα and ΔNtb<0 at this time. The target engine torque Te* becomes thus equal to the sum of the target feedforward engine torque Te* (FF) and the target feedback engine torque Te* (FB). The engine torque Te keeps on increasing to the target engine torque Te*.

At time t5, the forward clutch 25 shifts into the engagement termination phase after a lapse of the target clutch engagement time Δt* from the initiation time t3 of the clutch engagement phase. The clutch plate slippage has not yet been eliminated at this time.

Between time t5 and time t6, the engine torque Te is kept constant so as to cancel the clutch plate slip gradually and promptly. The engine torque Te may alternatively be decreased during the period of the clutch engagement termination phase between time t5 and time t6.

At time t6, the forward clutch 25 comes into full engagement upon elimination of the clutch plate slippage.

At time t7, the hydraulic pressure control line of the hydraulic control valve unit 7 is changed to directly supply the pressure regulated by the clutch regulator valve 45 to the forward clutch 25. At this time, the amount of torque-down control on the engine torque Te starts gradually decreasing so that the engine torque Te increases. When the engine torque Te reaches a given degree, the engine torque control is cancelled. Then, the engine torque Te reaches its maximum degree.

Figure 16:
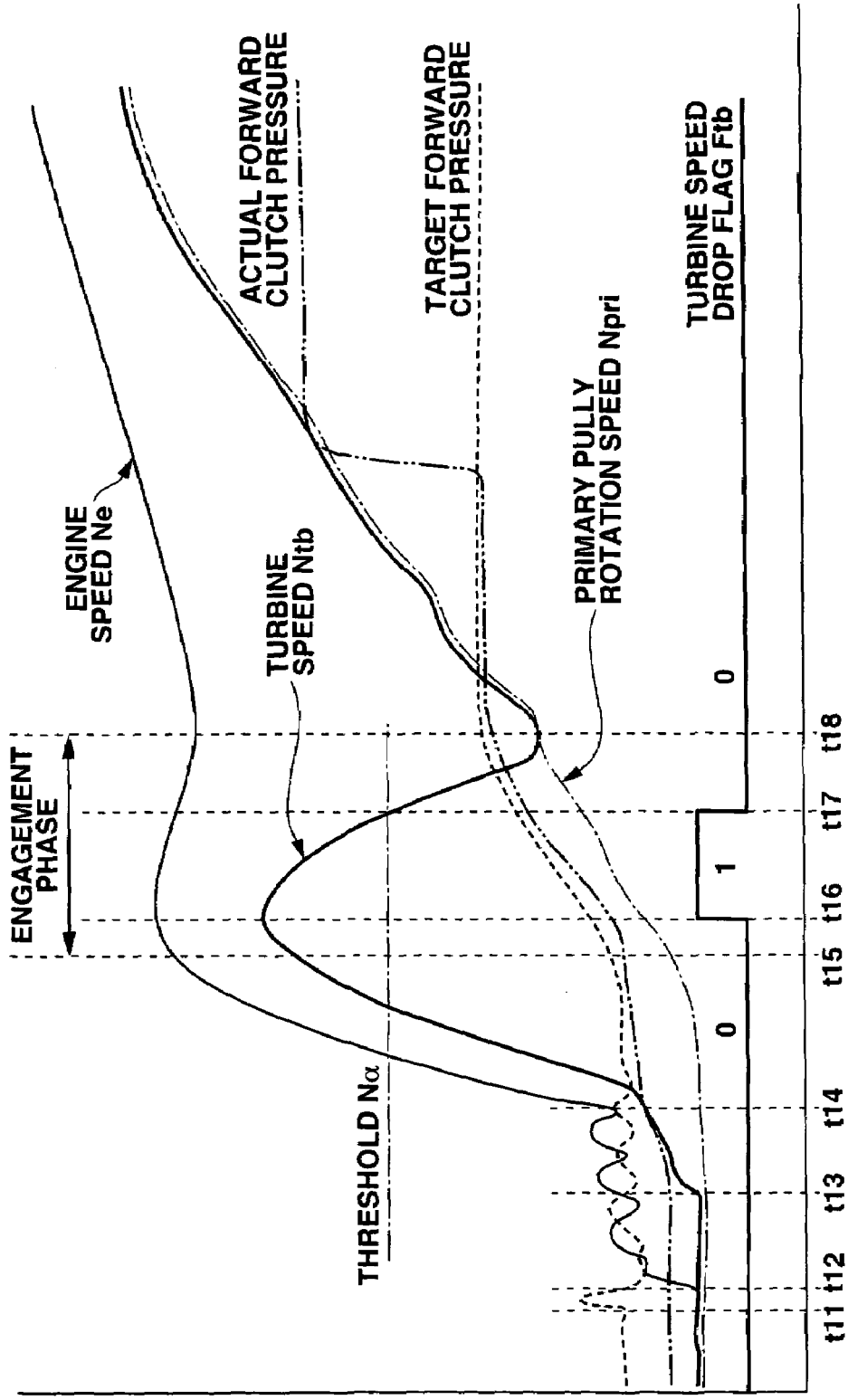

Further, the engine speed Ne changes over time as follows as shown in FIG. 16 under the engine torque control of the first embodiment.

At time t11, the clutch engagement pressure Pc starts increasing toward the target precharge pressure Pp* upon a driver's accelerator pedal operation.

At time t12, the engine speed Ne starts increasing in response to changes in the accelerator opening θ although complete combustion has not yet occurred in the engine 11.

At time t13, the turbine speed Ntb starts increasing.

At time t14, complete combustion occurs in the engine 11 so that the engine speed Ne becomes sharply increased. The turbine speed Ntb follows the engine speed Ne to become also increased sharply.

Between time t14 and time t15, the turbine speed Ntb reaches and exceeds the given threshold value Nα.

At time t15, the forward clutch 25 shifts into the engagement phase upon completion of the piston stroke for clutch play elimination. Both of the engine speed Ne and the turbine speed Ntb keep on increasing.

At time t16, the time differential value ΔNe of the engine speed Ne starts decreasing so that the time differential value ΔNtb of the turbine speed Ntb becomes negative. Namely, the turbine speed drop flag Ftb is set to 1 upon satisfaction of the clutch plate slippage condition of Ntb≧Nα and ΔNtb<0. The feedback control of the engine torque Te is performed based on the target feedback engine torque Te* (FB).

At time t18, the turbine speed Ntb starts increasing once again so that the time differential value ΔNtb of the turbine speed Ntb becomes positive. Further, the primary pulley rotation speed Npri gets agreed with the turbine speed Ntb and then increases with the turbine speed Ntb. The forward clutch 25 comes into full engagement.

As described above, it is possible according to the first embodiment to control the output of the engine 11 and the engagement of the forward clutch 25 in such a manner as to allow the vehicle to make a smooth start upon the restart of the engine 11 after the idle stop.

A drive control system for an automotive vehicle according to the second embodiment of the present invention will be next explained below. The vehicle drive control system of the second embodiment is structurally similar to that of the first embodiment, except that the target feedback torque calculation circuit 320 is configured to make, based on the speed difference (Ntb−Npri), a correction to the target speed change rate ΔN*.

The target feedback torque calculation circuit 320 of the second embodiment has a correction factor setting section 322a, a division section 322b and a multiplication section 322c as shown in FIG. 17 in place of the target differential speed change rate calculating section 322 of the first embodiment.

The correction factor setting section 322a stores therein a correction factor setting map to set a correction factor K based on the speed difference (Ntb−Npri) and outputs the correction factor to the multiplication section 322c. In the correction factor setting map, the correction factor K is defined in such a manner that it decreases with the speed difference (Ntb−Npri).

The division section 322b divides the speed difference (Ntb−Npri) by the target clutch engagement time Δt* to determine the target speed change rate ΔN* and outputs the multiplication section 322c.

The multiplication section 322 multiplies the target speed change rate ΔN* by the correction factor K and outputs the corrected target speed change rate ·KΔN* to the subtractor section 324.

By such correction, the target speed change rate ΔN* can be corrected to the more accurate value K·ΔN* so that the speed change rate difference err(t) becomes smaller before the forward clutch 25 comes into full engagement. This makes it possible to achieve smooth engagement of the forward clutch 25.

The entire contents of Japanese Patent Application No. 2005-036410 (filed on Feb. 14, 2005) are herein incorporated by reference.

Although the present invention has been described with reference to the specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A drive control system for an automatic vehicle, comprising:
   an engine;
   an automatic transmission;
   a torque converter disposed between the engine and the automatic transmission;
   an oil pump driven in synchronism with the engine;
   a start clutch engaged under a hydraulic oil pressure discharged from the oil pump to allow torque transmission from the engine to the automatic transmission via the torque converter at a start of the vehicle;
   an engine control unit that controls an output torque of the engine;
   a hydraulic pressure control unit that regulates the hydraulic oil pressure to control an engagement state of the start clutch;
   an automatic engine stop/restart control unit that stops the engine upon satisfaction of certain vehicle conditions and restarts the engine upon dissatisfaction of the certain vehicle conditions; and
   a torque transmission control unit configured to: calculate a target clutch engagement time and a final target clutch engagement torque of the start clutch based on an accelerator opening of the vehicle; calculate a transient target engine clutch engagement torque based on the target clutch engagement time and the final target clutch engagement torque; and cause the hydraulic pressure control unit and the engine control unit to control the engagement state of the start clutch and the output torque of the engine according to the transient target clutch engagement torque, at a restart of the engine.

2. The drive control system of claim 1, further comprising:
an engine speed sensor to detect a rotation speed of the engine; and
a clutch output shaft rotation speed sensor to detect an output shaft rotation speed of the start clutch,
wherein the torque transmission control unit is configured to calculate a torque ratio of the torque converter from a ratio between the rotation speed of the engine and the output shaft rotation speed of the start clutch and determine a target engine torque based on the transient target clutch engagement torque and the torque ratio.

3. The drive control system of claim 2, wherein the torque transmission control is configured to perform feedback control on the target engine torque while maintaining the transient target clutch engagement torque.

4. The drive control system of claim 3, further comprising a turbine shaft rotation speed sensor to detect a turbine shaft rotation speed of the torque converter,
wherein the torque transmission control unit is configured to start the feedback control upon detection of a drop in the turbine shaft rotation speed.

5. The drive control system of claim 3, further comprising:
a turbine shaft rotation speed sensor to detect a turbine shaft rotation speed of the torque converter,
wherein the torque transmission control unit is configured to calculate a speed difference between the turbine shaft rotation speed and the start clutch output shaft rotation speed and perform the feedback control based on the speed difference.

6. The drive control system of claim 5, wherein the torque transmission control unit is configured to make a correction to decrease a time change rate of said speed difference before the start clutch comes into full engagement.

7. The drive control system of claim 1, wherein the automatic transmission is a continuously variable transmission with a torque transmission belt.

8. A drive control system for an automotive vehicle, the vehicle having an engine, an automatic transmission, a torque converter and a start clutch engaged to transmit an output torque of the engine to the automatic transmission via the torque converter at a start of the vehicle, the drive control system comprising:
means for automatically stopping the engine upon satisfaction of certain vehicle conditions and restarting the engine upon dissatisfaction of the certain vehicle conditions;
means for supplying a hydraulic pressure to engage the start clutch at a restart of the engine;
means for detecting an accelerator opening of the vehicle;
means for determining a target clutch engagement time and a final target clutch engagement torque based on the accelerator opening;
means for determining a transient target clutch engagement pressure and a transient target clutch engagement torque based on the accelerator opening, the target clutch engagement time, and the final target clutch engagement torque;
means for determining a target engine torque based on the transient target clutch engagement torque;
means for adjusting the hydraulic pressure to the transient target clutch engagement pressure; and
means for adjusting the output torque of the engine to the target engine torque.

9. The drive control system of claim 8, further comprising:
means for detecting a rotation speed of the engine;
means for detecting an output shaft rotation speed of the start clutch; and
means for calculating a torque ratio of the torque converter from a ratio between the engine rotation speed and the start clutch output shaft rotation speed,
wherein the target engine torque is determined based on the transient target clutch engagement torque and the torque ratio.

10. The drive control system of claim 8, further comprising:
means for detecting a turbine shaft rotation speed of the torque converter;
means for detecting an output shaft rotation speed of the start clutch;
means for calculating a speed difference between the turbine shaft rotation speed and the start clutch output shaft rotation speed; and
means for performing feedback control on the target engine torque based on said speed difference.

11. A drive control method for an automotive vehicle, the vehicle having an engine, an automatic transmission, a torque converter and a start clutch engaged to transmit an output torque of the engine to the automatic transmission via the torque converter at a start of the vehicle, the drive control method comprising:
stopping the engine upon satisfaction of certain vehicle conditions;
after said stopping, restarting the engine upon dissatisfaction of the certain vehicle conditions;
upon said restarting, supplying a hydraulic pressure to engage the start clutch;
detecting an accelerator opening of the vehicle;
determining a target clutch engagement time and a final target clutch engagement torque based on the accelerator opening;
determining a transient target clutch engagement pressure and a transient target clutch engagement torque based on the accelerator opening, the target clutch engagement time and the final target clutch engagement torque;
determining a target engine torque based on the transient target clutch engagement torque;
adjusting the hydraulic pressure to the transient target clutch engagement pressure; and
adjusting the output torque of the engine to the target engine torque.

12. The drive control method of claim 11, further comprising:
detecting a rotation speed of the engine;
detecting an output shaft rotation speed of the start clutch; and
calculating a torque ratio of the torque converter from a ratio between the engine rotation speed and the start clutch output shaft rotation speed,
wherein the target engine torque is determined based on the transient target clutch engagement torque and the torque ratio.

13. The drive control method of claim 11, further comprising:
detecting a turbine shaft rotation speed of the torque converter;
detecting an output shaft rotation speed of the start clutch;
calculating a speed difference between the turbine shaft rotation speed and the start clutch output shaft rotation speed; and
performing feedback control on the target engine torque based on said speed difference.

* * * * *